(12) United States Patent
Sugawara

(10) Patent No.: US 6,563,642 B2
(45) Date of Patent: May 13, 2003

(54) OBSERVATION OPTICAL SYSTEM AND OPTICAL APPARATUS HAVING THE SAME

(75) Inventor: Saburo Sugawara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/796,454

(22) Filed: Mar. 2, 2001

(65) Prior Publication Data

US 2001/0006431 A1 Jul. 5, 2001

Related U.S. Application Data

(62) Division of application No. 09/217,935, filed on Dec. 22, 1998, now Pat. No. 6,226,122.

(30) Foreign Application Priority Data

Jan. 6, 1998 (JP) .............................. 10-00850
Dec. 14, 1998 (JP) ........................... 10-354525

(51) Int. Cl.⁷ ......................... G02B 27/64; G02B 23/00
(52) U.S. Cl. ...................... 359/557; 359/407; 359/554
(58) Field of Search ................. 359/407, 409, 359/411–418, 422, 431–432, 480–482, 831–838, 554–557

(56) References Cited

U.S. PATENT DOCUMENTS

| 4,974,950 A | 12/1990 | Yamazaki et al. ......... 359/557 |
| 4,991,942 A | 2/1991 | Fujibayashi et al. ........ 359/690 |
| 5,028,125 A | 7/1991 | Kikuchi ..................... 359/422 |
| 5,071,242 A | 12/1991 | Yanagisawa ................ 359/416 |
| 5,347,399 A | 9/1994 | Yoneyama et al. ......... 359/690 |
| 5,442,486 A | 8/1995 | Sato ........................... 359/557 |
| 5,661,597 A | 8/1997 | Sugawara ................... 359/557 |
| 5,694,244 A | 12/1997 | Abe et al. ................... 359/432 |
| 5,737,113 A | 4/1998 | Kuramochi et al. ........ 359/247 |
| 5,973,830 A | * 10/1999 | Ichikawa .................... 359/415 |
| 6,072,630 A | * 6/2000 | Yano .......................... 359/557 |

FOREIGN PATENT DOCUMENTS

| JP | 4-342215 | 11/1992 |
| JP | 9-105851 | 4/1997 |

* cited by examiner

Primary Examiner—Thong Nguyen
(74) Attorney, Agent, or Firm—Fitzpatrick, Cella, Harper & Scinto

(57) ABSTRACT

An observation optical system includes, in order from an object side, an objective lens having a first lens unit of positive refractive power, a second lens unit of negative refractive power and a third lens unit of positive refractive power, an erect optical system, and an eyepiece lens of positive refractive power for observing an object image formed through the objective lens, wherein an air separation between the first lens unit and the second lens unit and an air separation between the second lens unit and the third lens unit are made variable to effect variation of magnification.

7 Claims, 29 Drawing Sheets

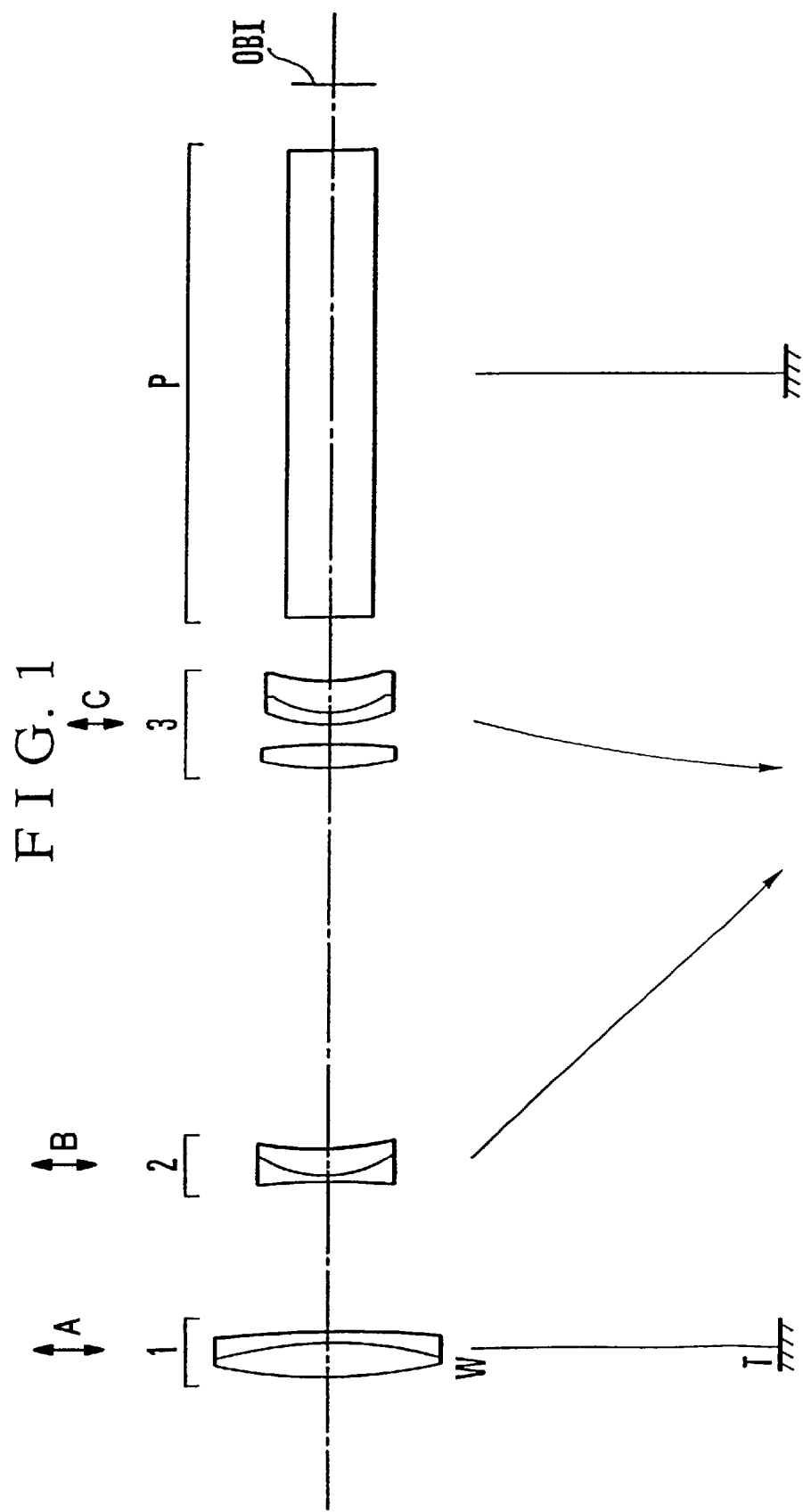

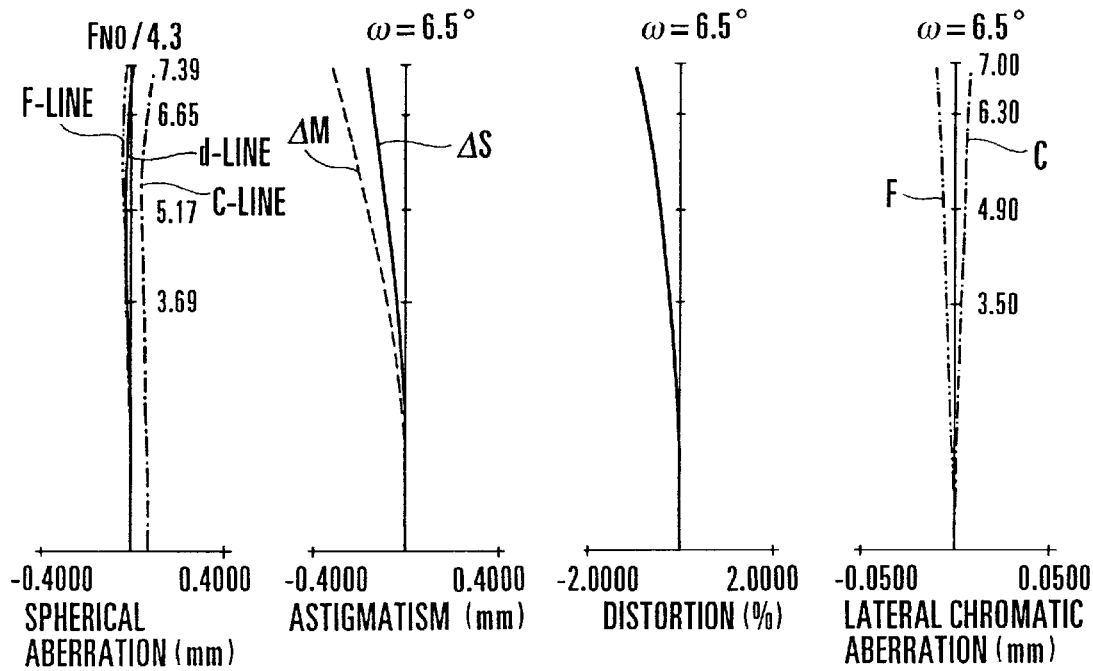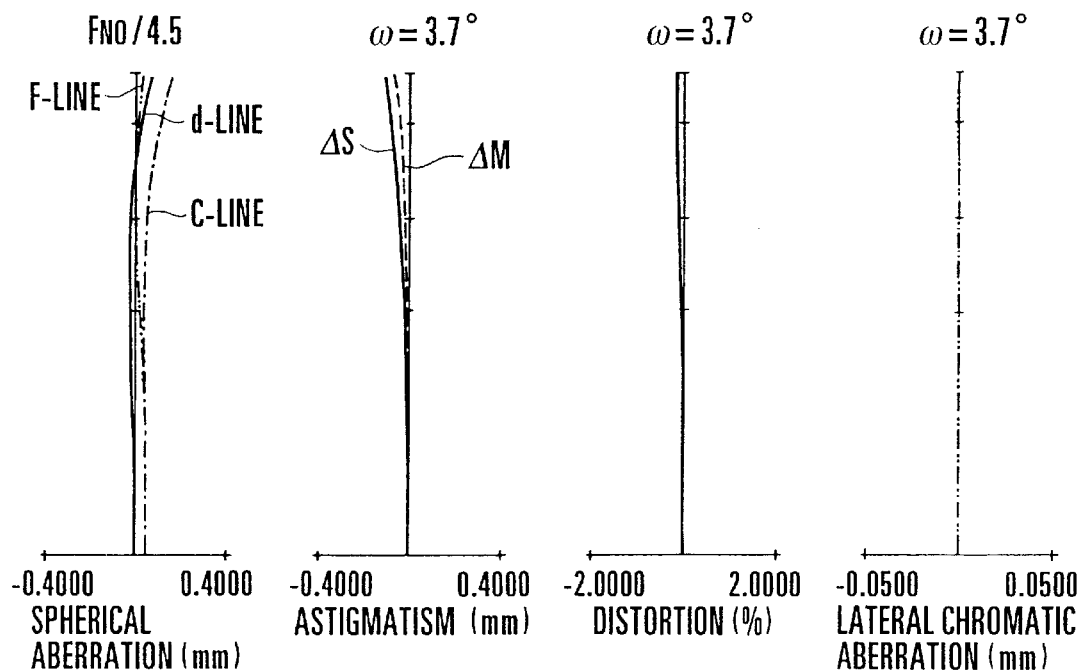

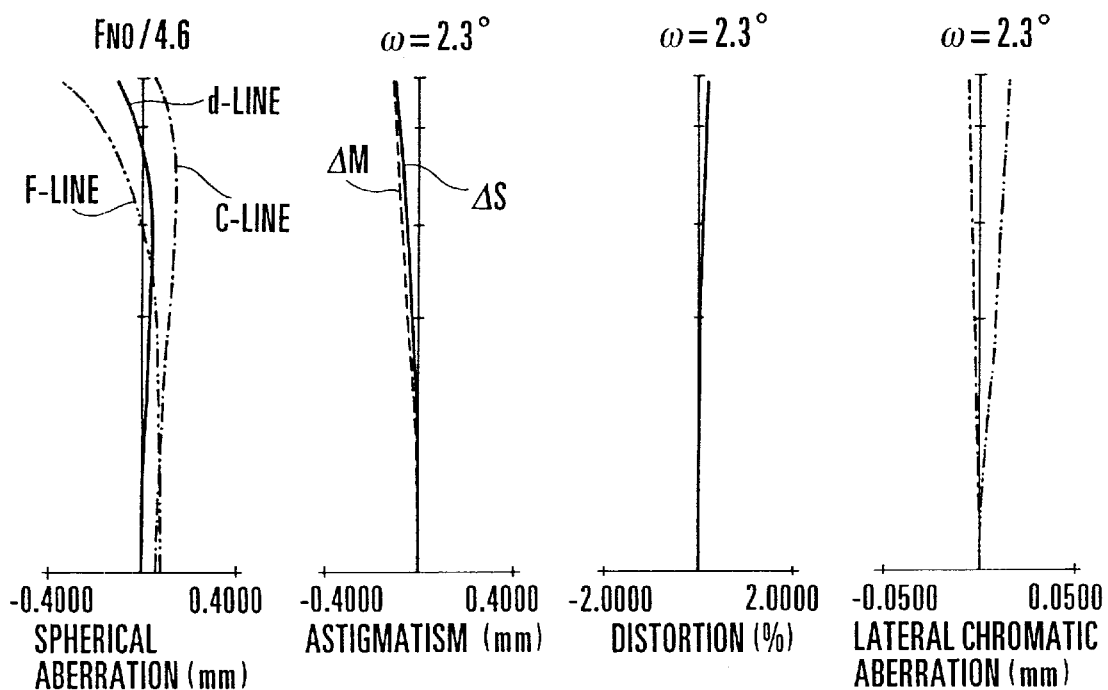

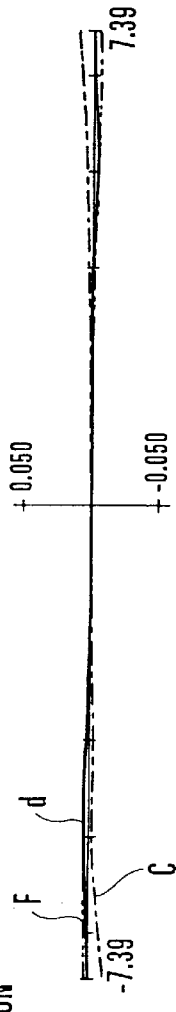
FIG. 5A   WIDE-ANGLE END
NORMAL POSITION
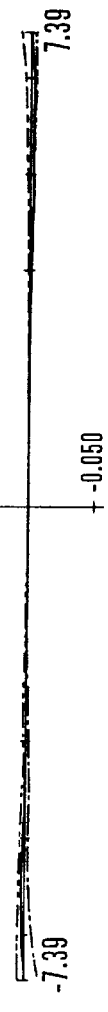
FIG. 5B   ANGLE OF DEVIATION OF RAY BY PARALLEL-DECENTERING
FIRST LENS UNIT : 0.3°
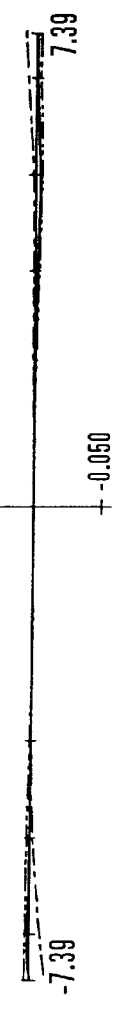
FIG. 5C   ANGLE OF DEVIATION OF RAY BY PARALLEL-DECENTERING
SECOND LENS UNIT : 0.3°
FIG. 5D   ANGLE OF DEVIATION OF RAY BY PARALLEL-DECENTERING
THIRD LENS UNIT : 0.3°

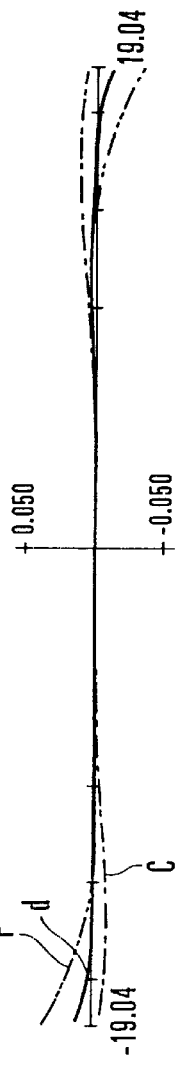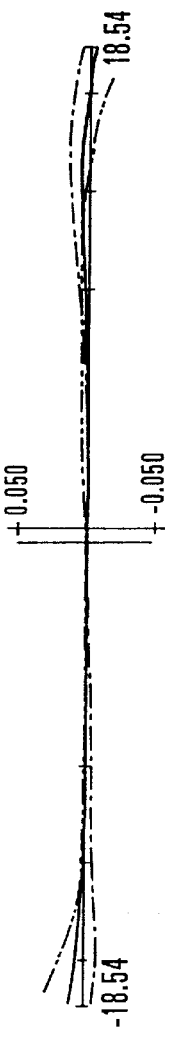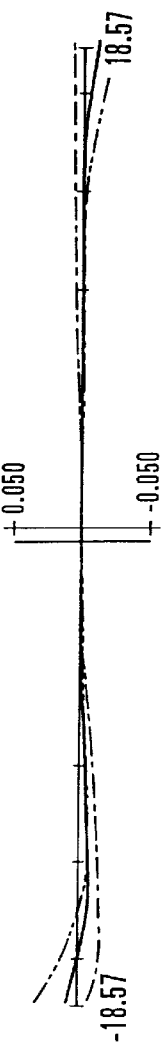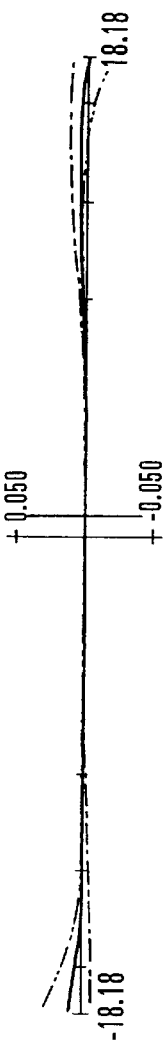
FIG. 6A  TELEPHOTO END NORMAL POSITION
FIG. 6B  ANGLE OF DEVIATION OF RAY BY PARALLEL-DECENTERING FIRST LENS UNIT : 0.3°
FIG. 6C  ANGLE OF DEVIATION OF RAY BY PARALLEL-DECENTERING SECOND LENS UNIT : 0.3°
FIG. 6D  ANGLE OF DEVIATION OF RAY BY PARALLEL-DECENTERING THIRD LENS UNIT : 0.3°

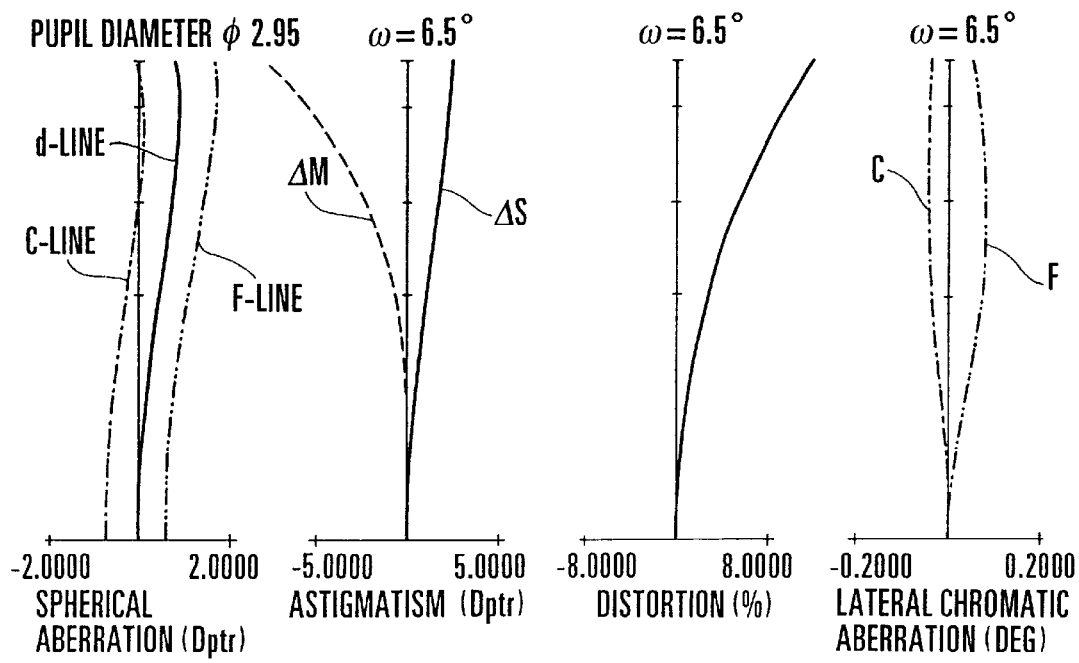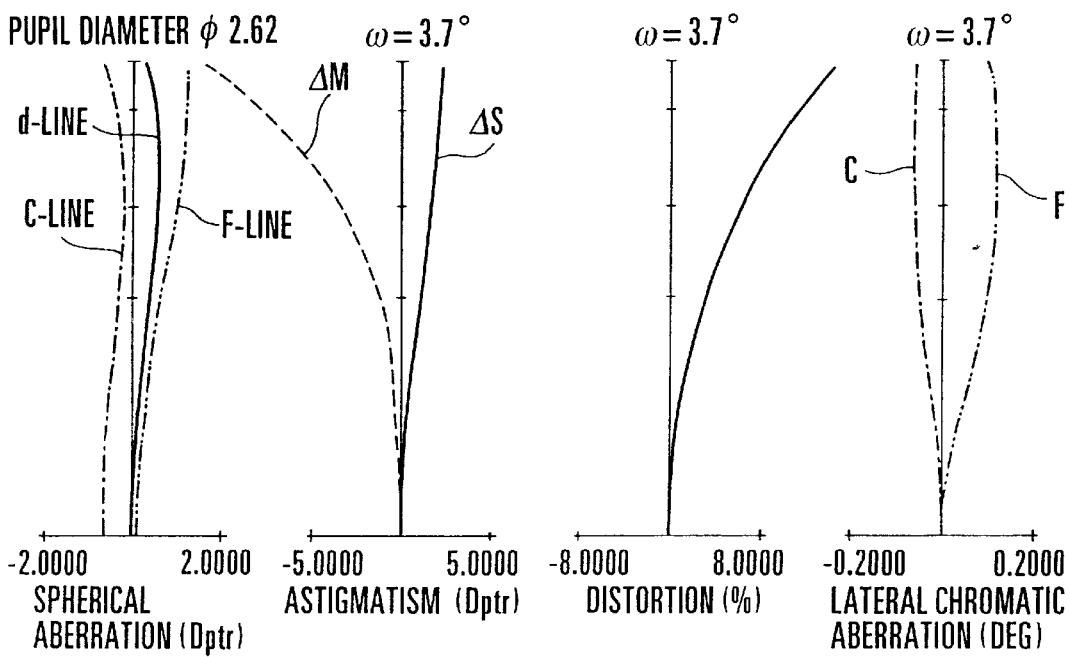

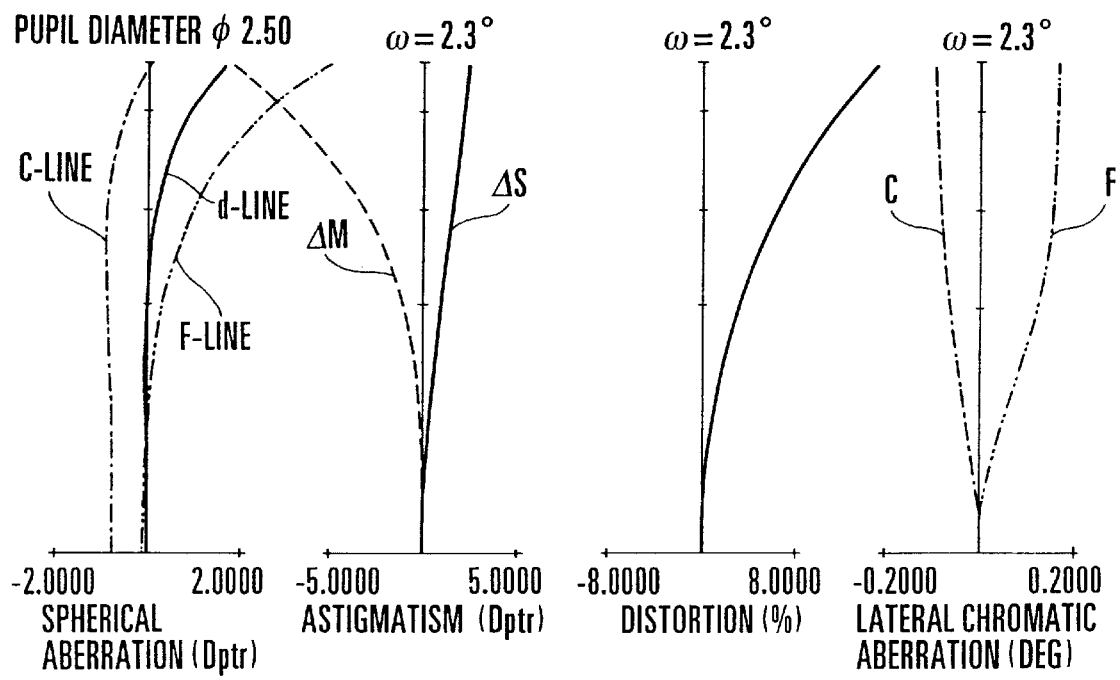

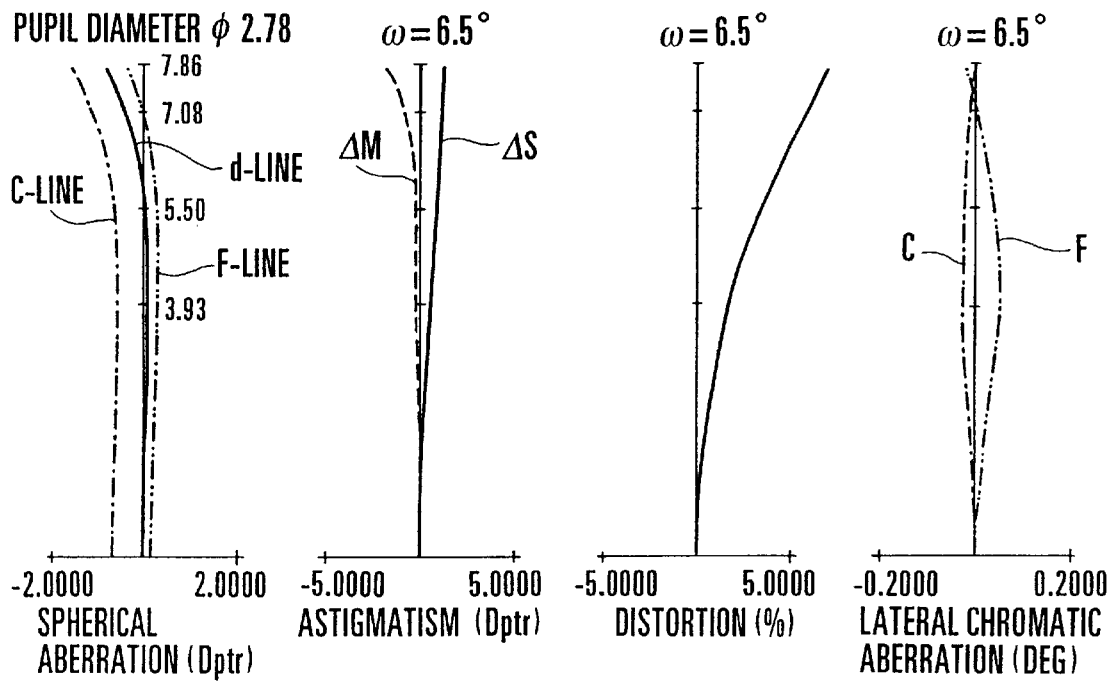
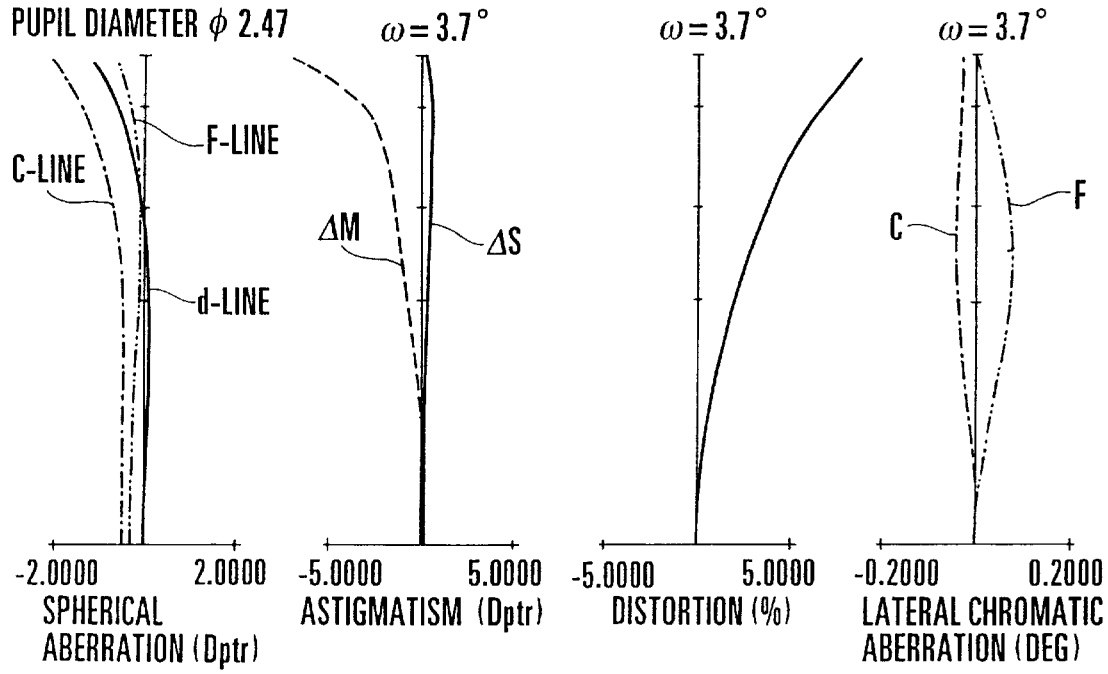

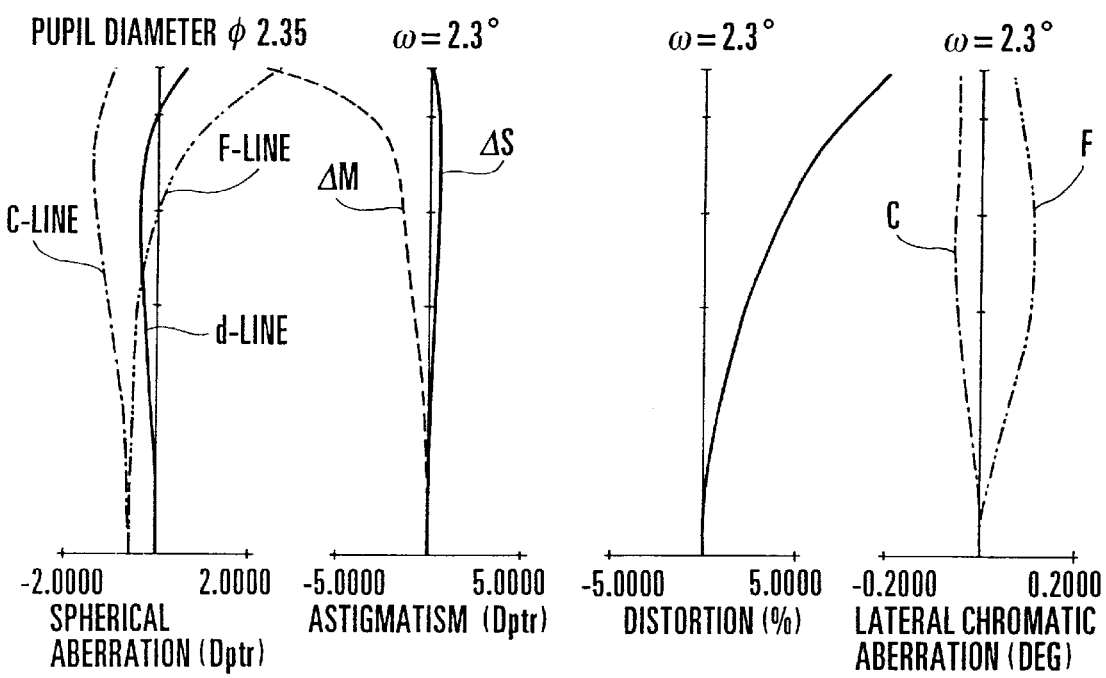

WIDE-ANGLE END

MIDDLE

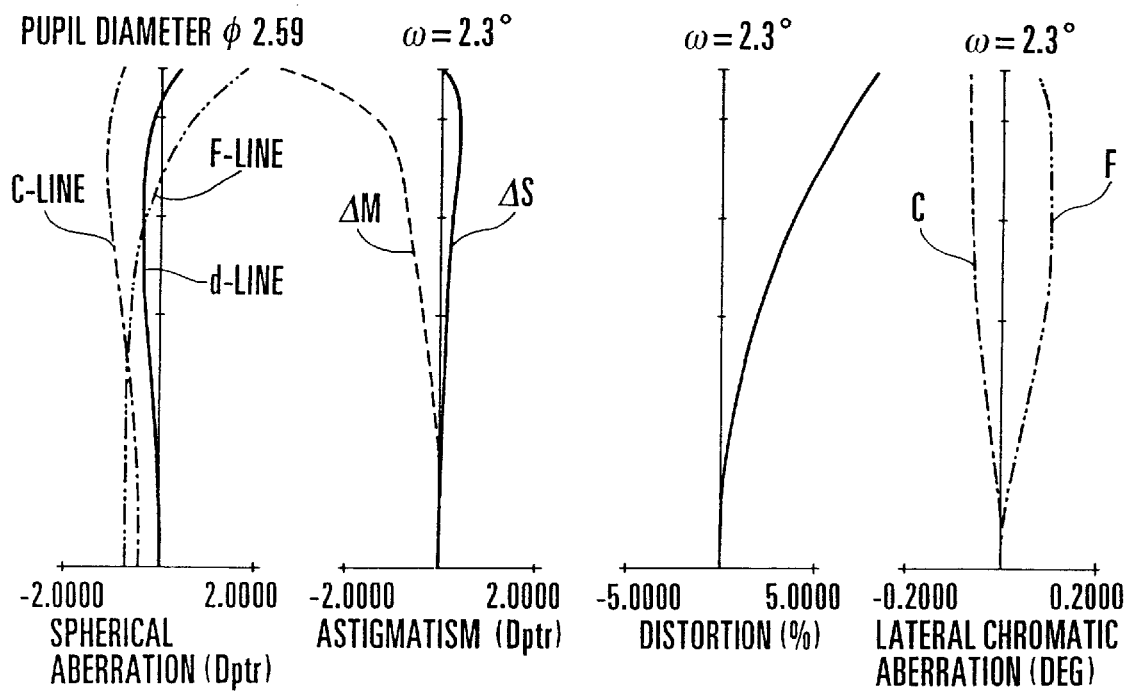

WIDE-ANGLE END

MIDDLE

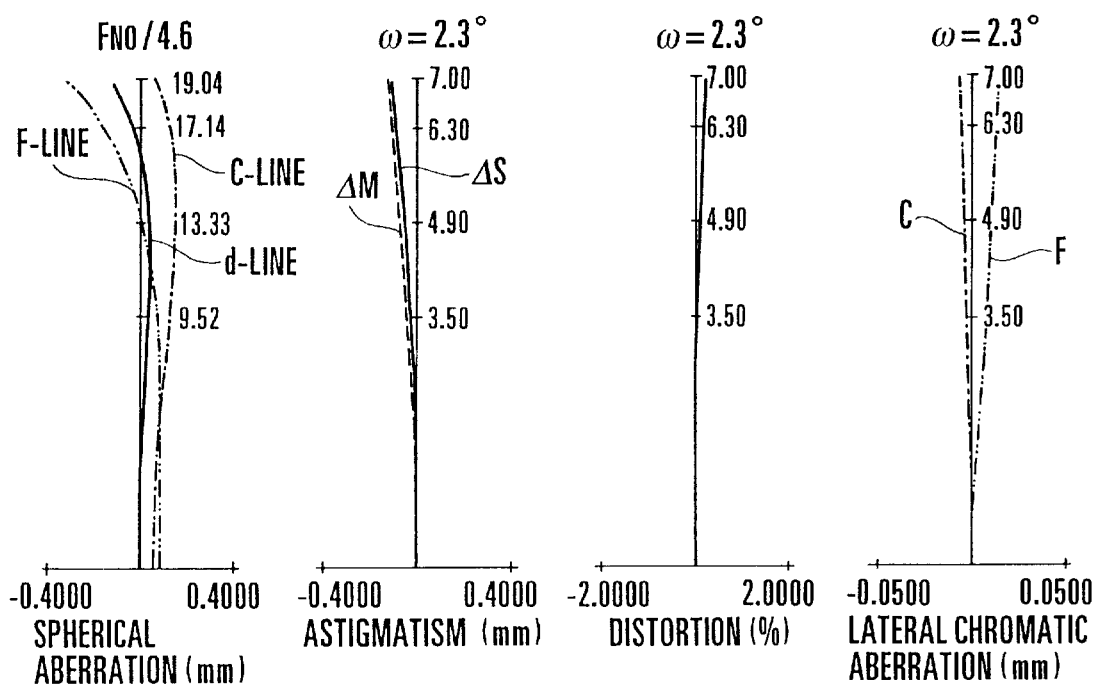

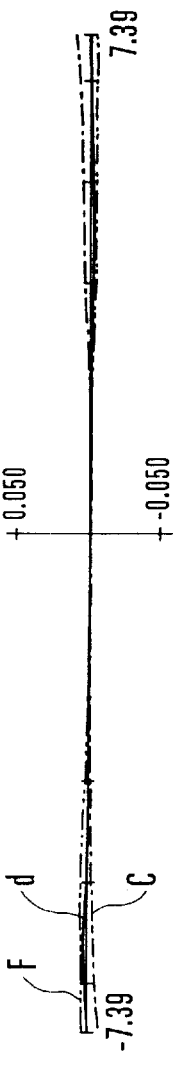
FIG.23A NORMAL POSITION (WIDE-ANGLE END)
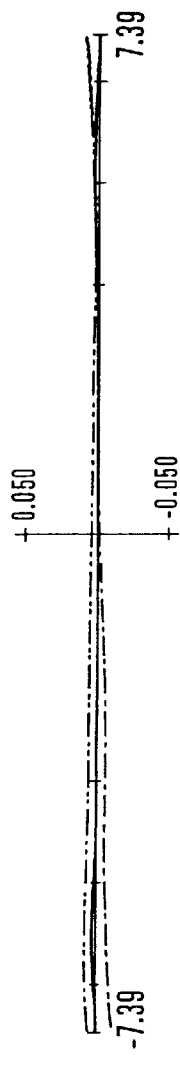
FIG.23B ANGLE OF DEVIATION OF RAY WHEN OPERATING VARIABLE ANGLE PRISM VAP: 0.3° (WIDE-ANGLE END)
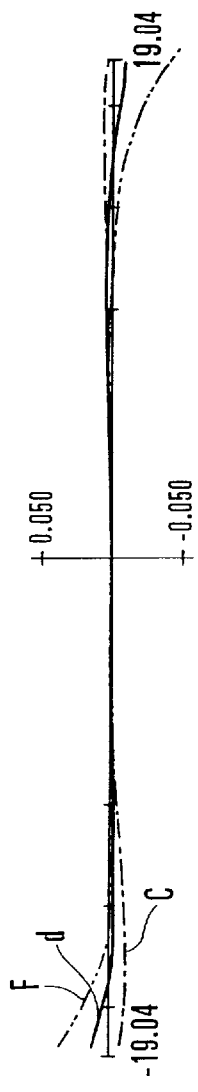
FIG.23C NORMAL POSITION (TELEPHOTO END)
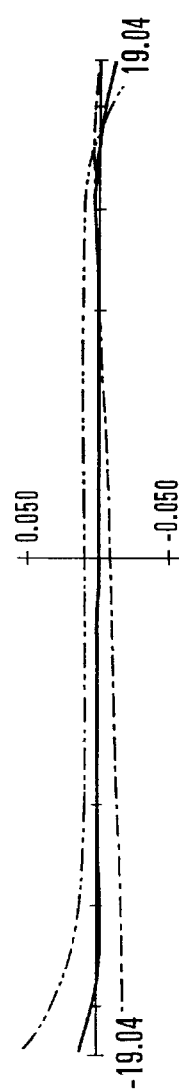
FIG.23D ANGLE OF DEVIATION OF RAY WHEN OPERATING VARIABLE ANGLE PRISM VAP: 0.3° (TELEPHOTO END)

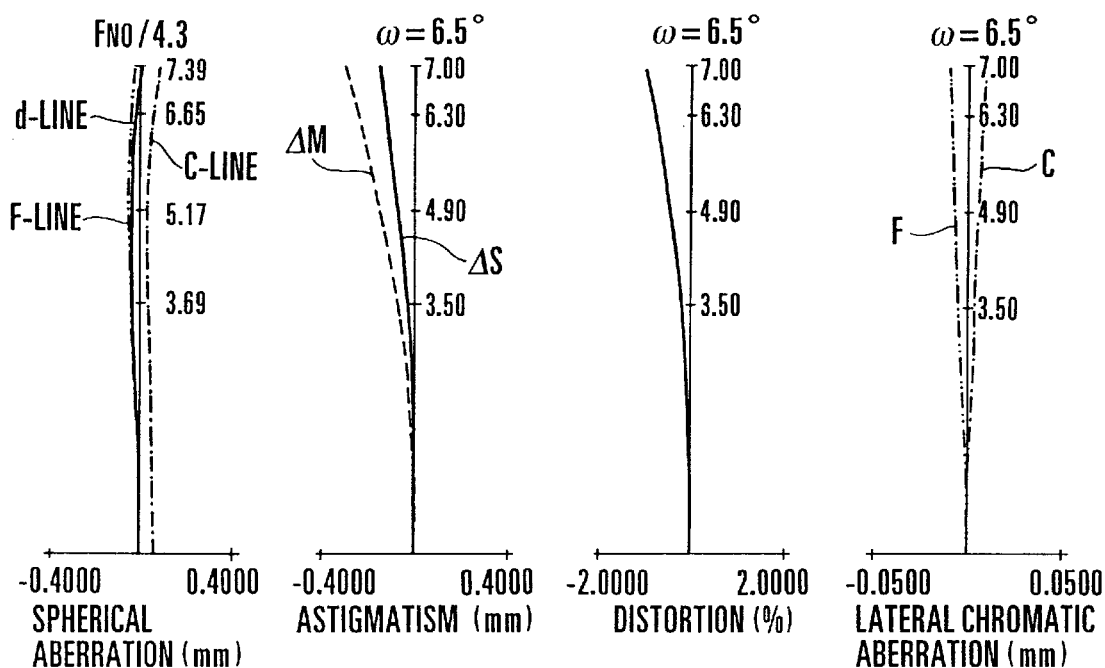
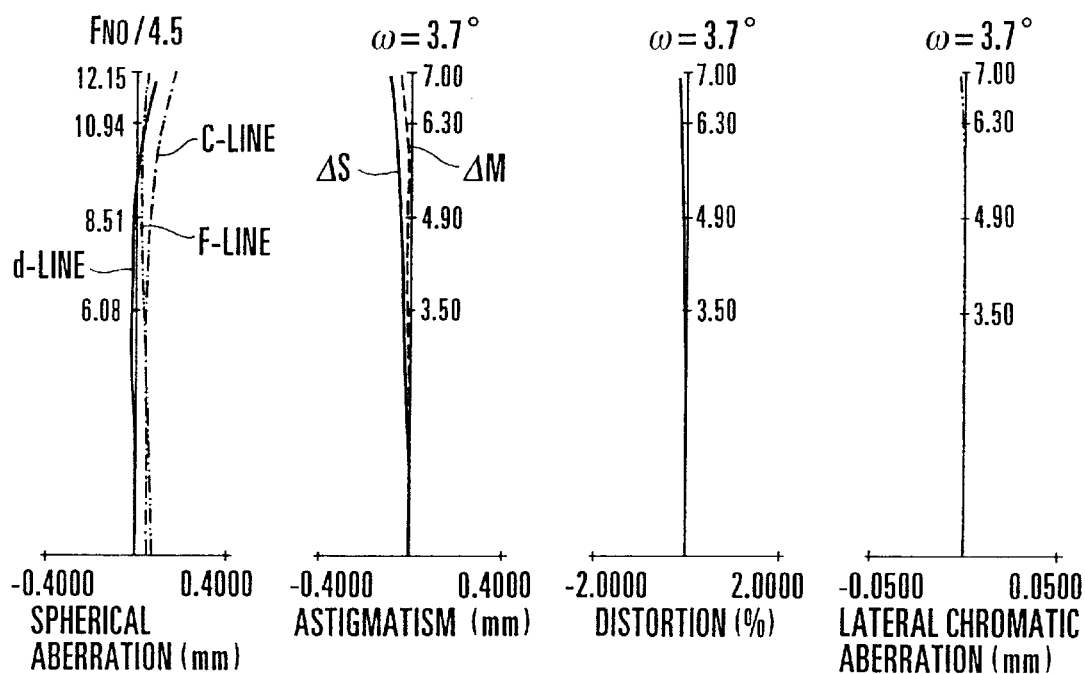

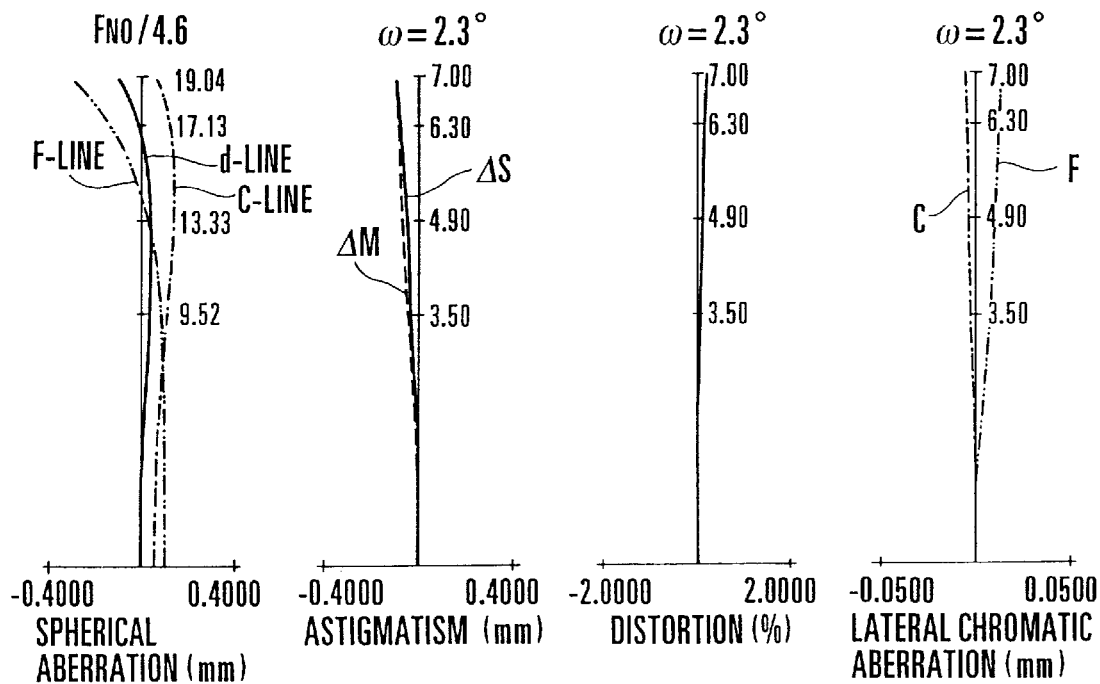

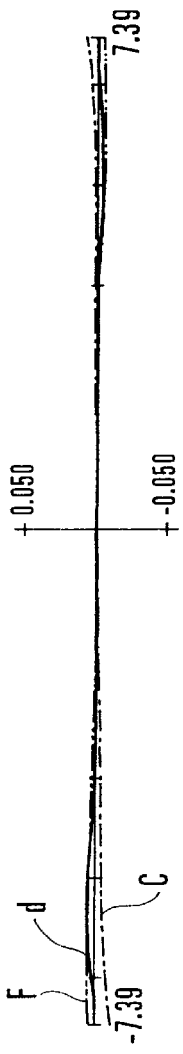
FIG.28A NORMAL POSITION (WIDE-ANGLE END)
FIG.28B ANGLE OF DEVIATION OF RAY WHEN OPERATING VARIABLE ANGLE PRISM VAP : 0.3° (WIDE-ANGLE END)
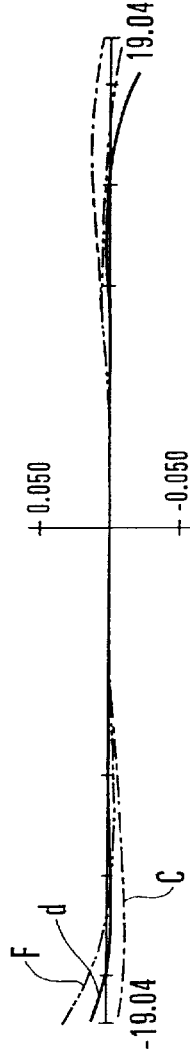
FIG.28C NORMAL POSITION (TELEPHOTO END)
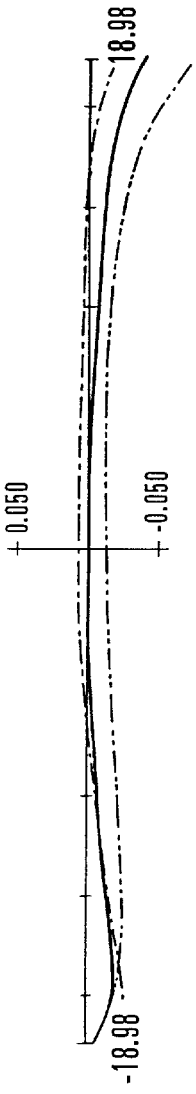
FIG.28D ANGLE OF DEVIATION OF RAY WHEN OPERATING VARIABLE ANGLE PRISM VAP : 0.3° (TELEPHOTO END)

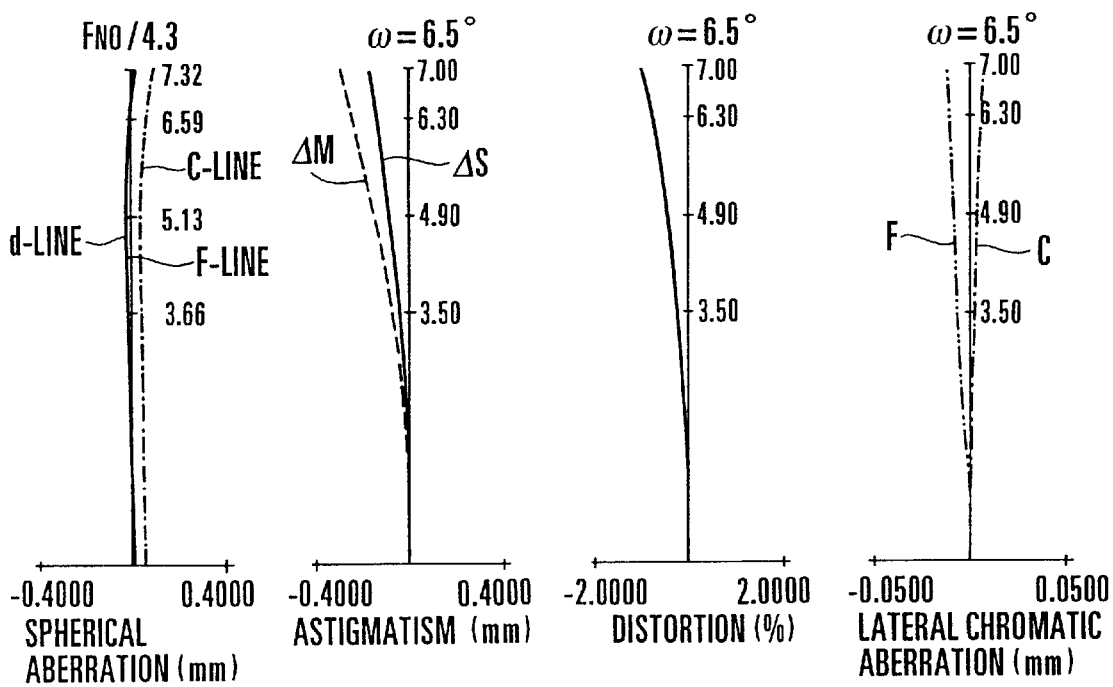
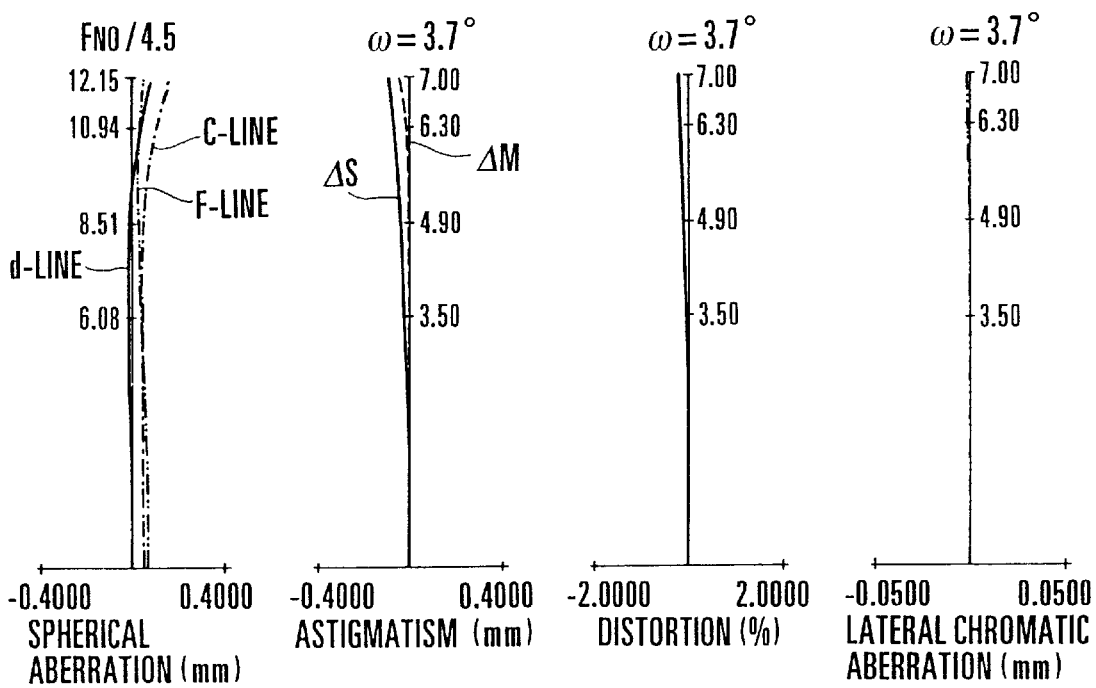

TELEPHOTO END

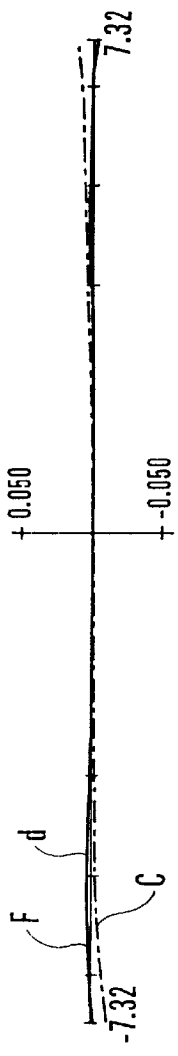
FIG.33A NORMAL POSITION (WIDE-ANGLE END)
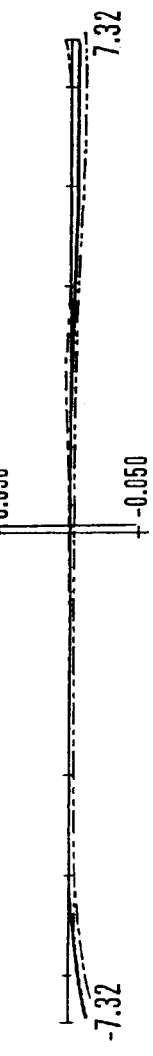
FIG.33B ANGLE OF DEVIATION OF RAY WHEN OPERATING VARIABLE ANGLE PRISM VAP : 0.3° (WIDE-ANGLE END)
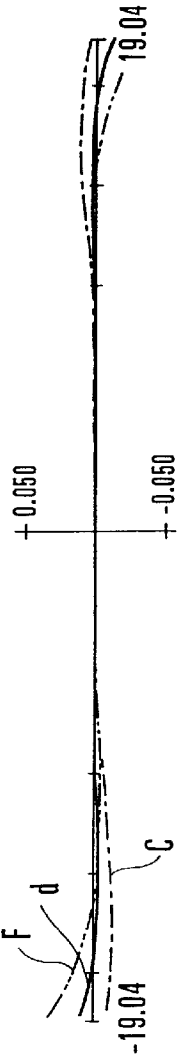
FIG.33C NORMAL POSITION (TELEPHOTO END)
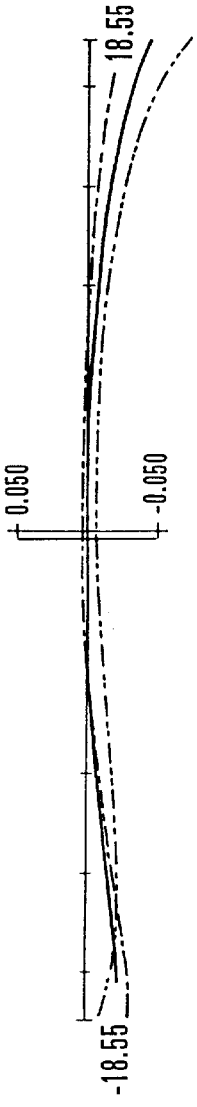
FIG.33D ANGLE OF DEVIATION OF RAY WHEN OPERATING VARIABLE ANGLE PRISM VAP : 0.3° (TELEPHOTO END)

OBSERVATION OPTICAL SYSTEM AND OPTICAL APPARATUS HAVING THE SAME

This is a divisional of application Ser. No. 09/217,935, filed Dec. 22, 1998 and now U.S. Pat. No. 6,226,122.

BACKGROUND OF THE INVENTION

1. Field of the Invention

The present invention relates to observation optical systems such as telescopes and binoculars and, more particularly, to an observation optical system having the zoom function of varying the magnification of an image being observed.

2. Description of Related Art

Mainstream conventional zoom binoculars perform zooming by a variable magnification eyepiece lens having a moving lens unit. FIG. 36 is a schematic diagram showing one example of conventional zoom binoculars, in which, for the purpose of simplicity, only one of the right and left optical systems of the binocular is illustrated.

In FIG. 36, reference numeral 100 denotes an objective lens of positive refractive power. An erect prism P is provided for erecting, and laterally reversing an object image OBI formed mainly by the objective lens 100. A variable magnification eyepiece lens 200 comprises a first lens unit 201 of negative refractive power, a second lens unit 202 of positive refractive power and a third lens unit 203 of positive refractive power. The object image OBI is formed at a position before (on the object side of) the second lens unit 202 through the objective lens 100, the erect prism P and the first lens unit 201 of the eyepiece lens 200.

In the binocular of such construction, the first lens unit 201 of the variable magnification eyepiece lens 200 is made axially movable for varying the image magnification, and to compensate for the image shift, or to correct the diopter, the second lens unit 202 is made to axially move.

Such a variable magnification eyepiece lens 200 is favorable to realize zoom binoculars relatively easily. Up to now, therefore, this arrangement has been very popularly employed.

However, the use of the above-described construction and arrangement for the variable magnification eyepiece lens in the zoom binoculars results in as narrow an apparent angle of view as 35–40 degrees at the low magnifications. To widen the field coverage, there is a need to increase the diameter of the second lens unit 202 and the bulk of the erect prism P. For this reason, it is difficult for the prior art arrangement to simultaneously fulfill the requirements of increasing the apparent field angle and of minimizing the bulk and size of the binocular.

BRIEF SUMMARY OF THE INVENTION

An object of the invention is to provide an observation optical system capable of increasing the field angle at the low magnification (in the wide-angle end) without having to increase the bulk and size of an apparatus having the observation optical system.

To attain the above object, in accordance with a first aspect of the invention, there is provided an observation optical system, which comprises, in order from an object side, an objective lens having a first lens unit of positive refractive power, a second lens unit of negative refractive power and a third lens unit of positive refractive power, an erect optical system, and an eyepiece lens of positive refractive power for observing an object image formed through the objective lens, wherein an air separation between the first lens unit and the second lens unit and an air separation between the second lens unit and the third lens unit are made variable to effect variation of magnification.

In accordance with a second aspect of the invention, there is provided an observation optical system, which comprises, in order from an object side, an objective lens having a front lens unit of positive refractive power, a variator lens unit and a compensator lens unit, an erect optical system, and an eyepiece lens of positive refractive power for observing an object image formed through the objective lens, wherein the following condition is satisfied:

$$0.7 < \beta t < 1.4$$

where $\beta t$ is an overall lateral magnification in a telephoto end of the objective lens excluding the front lens unit.

In accordance with a third aspect of the invention, there is provided an optical apparatus comprising the observation optical system according to one of the first and second aspects described above.

In accordance with a fourth aspect of the invention, there is provided a binocular, which comprises, in order from an object side, a pair of objective lenses each having a first lens unit of positive refractive power, a second lens unit of negative refractive power and a third lens unit of positive refractive power, a pair of erect optical systems, and a pair of eyepiece lenses of positive refractive power for observing a pair of object images respectively formed through the pair of objective lenses, wherein in each of the pair of objective lenses, an air separation between the first lens unit and the second lens unit and an air separation between the second lens unit and the third lens unit are made variable to effect variation of magnification.

In accordance with a fifth aspect of the invention, there is provided a binocular, which comprises, in order from an object side, a pair of objective lenses of variable focal length, a pair of erect optical systems each having an entering optical axis and an exiting optical axis deviating from each other, and a pair of eyepiece lenses, wherein interpupillary adjustment is performed by rotating the erect optical systems and the eyepiece lenses around respective optical axes, as rotation axes, of the objective lenses.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 1 is a longitudinal section view of an observation optical system according to a first embodiment of the invention with the eyepiece lens not shown.

FIGS. 2A to 2D are graphic representations of the aberrations of the objective lens of the first embodiment in the wide-angle end when the image-shake compensating function is rendered inoperative.

FIGS. 3A to 3D are graphic representations of the aberrations of the objective lens of the first embodiment in a middle focal length position when the image-shake compensating function is rendered inoperative.

FIGS. 4A to 4D are graphic representations of the aberrations of the objective lens of the first embodiment in the telephoto end when the image-shake compensating function is rendered inoperative.

FIGS. 5A to 5D are graphic representations of the lateral aberrations with the axial beam of the objective lens of the first embodiment in the wide-angle end when a respective one of the lens units is moved in a direction perpendicular to an optical axis.

FIGS. 6A to 6D are graphic representations of the lateral aberrations with the axial beam of the objective lens of the first embodiment in the telephoto end when a respective one of the lens units is moved in a direction perpendicular to an optical axis.

FIGS. 8A to 8D are graphic representations of the aberrations with the afocal beam of the binocular of the second embodiment in the wide-angle end when the image-shake compensating function is rendered inoperative.

FIGS. 9A to 9D are graphic representations of the aberrations with the afocal beam of the binocular of the second embodiment in a middle focal length position when the image-shake compensating function is rendered inoperative.

FIGS. 10A to 10D are graphic representations of the aberrations with the afocal beam of the binocular of the second embodiment in the telephoto end when the image-shake compensating function is rendered inoperative.

FIGS. 12A to 12D are graphic representations of the aberrations with the afocal beam of the binocular of the third embodiment in the wide-angle end when the image-shake compensating function is rendered inoperative.

FIGS. 13A to 13D are graphic representations of the aberrations with the afocal beam of the binocular of the third embodiment in a middle focal length position when the image-shake compensating function is rendered inoperative.

FIGS. 14A to 14D are graphic representations of the aberrations with the afocal beam of the binocular of the third embodiment in the telephoto end when the image-shake compensating function is rendered inoperative.

FIGS. 18A to 18D are graphic representations of the aberrations with the afocal beam of the binocular of the fourth embodiment in the telephoto end when the image-shake compensating function is rendered inoperative.

FIGS. 22A to 22D are graphic representations of the aberrations of the objective lens of the fifth embodiment in the telephoto end when the image-shake compensating function is rendered inoperative.

FIGS. 23A to 23D are graphic representations of the lateral aberrations with the axial beam of the fifth embodiment when the variable angle prism VAP is rendered operative.

FIGS. 25A to 25D are graphic representations of the aberrations of the binocular of the sixth embodiment in the wide-angle end when the image-shake compensating function is rendered inoperative.

FIGS. 26A to 26D are graphic representations of the aberrations of the binocular of the sixth embodiment in a middle focal length position when the image-shake compensating function is rendered inoperative.

FIGS. 27A to 27D are graphic representations of the aberrations of the binocular of the sixth embodiment in the telephoto end when the image-shake compensating function is rendered inoperative.

FIGS. 28A to 28D are graphic representations of the lateral aberrations with the axial beam of the sixth embodiment when the variable angle prism VAP is rendered operative.

FIGS. 30A to 30D are graphic representations of the aberrations of the binocular of the seventh embodiment in the wide-angle end when the image-shake compensating function is rendered inoperative.

FIGS. 31A to 31D are graphic representations of the aberrations of the binocular of the seventh embodiment in a middle focal length position when the image-shake compensating function is rendered inoperative.

FIGS. 33A to 33D are graphic representations of the lateral aberrations with the axial beam of the seventh embodiment when the variable angle prism VAP is rendered operative.

DETAILED DESCRIPTION OF THE INVENTION

Figure 7:
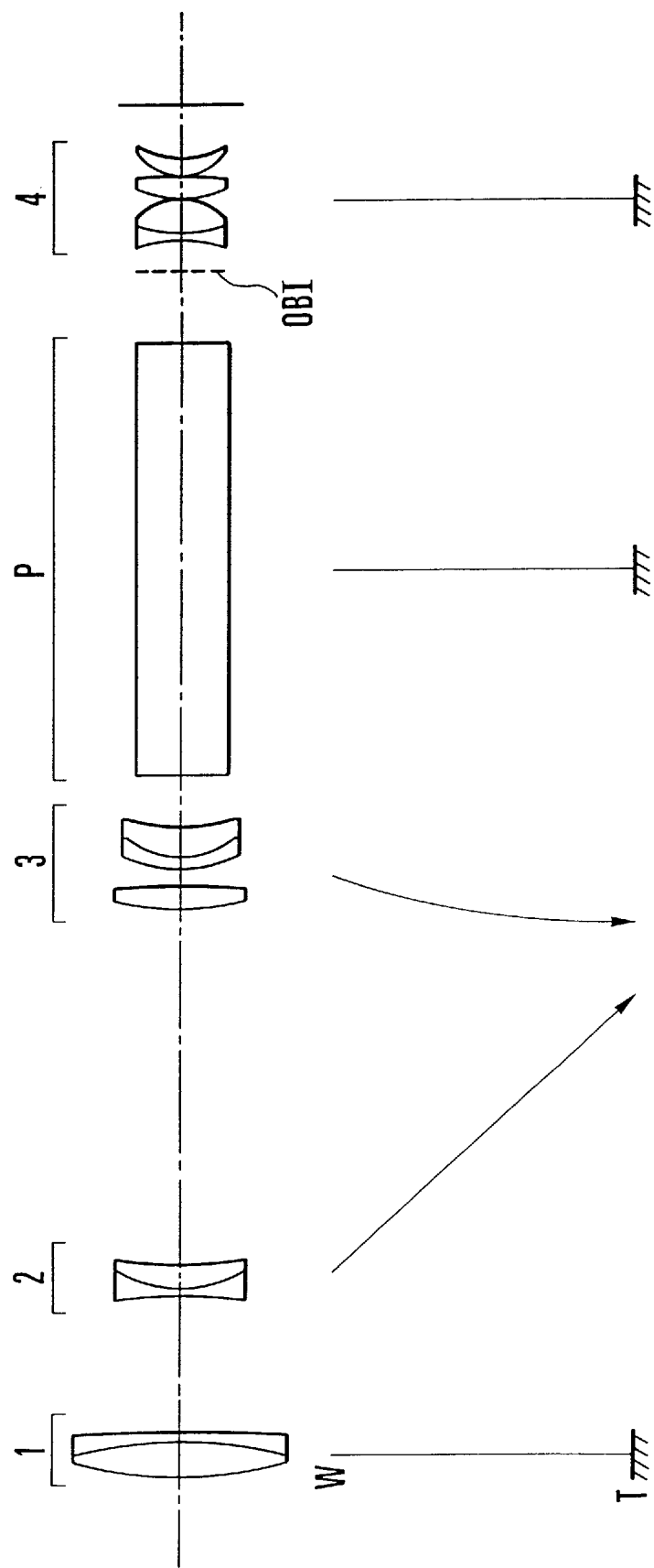
FIG. 7 is a longitudinal section view of a binocular according to a second embodiment of the invention.

Hereinafter, preferred embodiments of the invention will be described in detail with reference to the drawings.

(First Embodiment)

FIG. 1 in block-diagram form shows an objective lens and an erect prism according to a first embodiment of the invention, as applied to an observation optical system such as a binocular or a telescope. In FIG. 1, for the purpose of simplicity, the eyepiece lens is not illustrated here, but what is suitable as the eyepiece lens for the objective lens of the first embodiment will become apparent in the other embodiments to be described later.

Referring to FIG. 1, the objective lens is constructed with three lens units 1 to 3, i.e., in order from an object side, a first lens unit 1 of positive refractive power, a second lens unit 2 of negative refractive power and a third lens unit 3 of positive refractive power. During zooming from the wide-angle end to the telephoto end, the first lens unit 1 remains stationary, the second lens unit 2 axially moves from the object side to the observation side, and the third lens unit 3 axially moves from the observation side to the object side in such relation as to compensate for the shift of an image plane resulting from the movement of the second lens unit 2. The erect prism P is illustrated in developed form, which has the function of erecting and laterally reversing an object image OBI formed by the objective lens. Then, the object image OBI formed by the objective lens is enlarged by an eyepiece lens (not shown) and is guided to the observer's eye.

The observation optical system shown in FIG. 1 has an image stabilizing function of preventing the shaking of an image plane caused by the vibration of the hands holding the apparatus. The image stabilizing function is performed in such a manner that, based on information on the vibration detected by a vibration gyro-sensor (not shown), at least one of the first lens unit 1, the second lens unit 2 and the third lens unit 3 is made to be displaced in directions perpendicular to an optical axis.

In a case where the first lens unit 1 is made to be displaced in directions perpendicular to the optical axis to attain the image stabilizing function, the required amount of movement of the first lens unit 1 for the vibration information can be made constant irrespective of the change in the zooming position, so that there is an advantage of assuring simplification of a control circuit (not shown) for controlling the movement of the first lens unit 1.

On the other hand, in a case where the second lens unit 2 or the third lens unit 3 is made to displace in directions perpendicular to the optical axis to attain the image stabilizing function, the lens unit to be moved is relatively small in diameter and light in weight, so that there is an advantage that an actuator of small size suffices for driving that lens unit.

In the first embodiment as applied to the binocular, focusing is carried out by axially moving the first lens unit 1. The axial alignment between the left and right optical systems is adjusted in the reference position by moving the first lens unit 1 in a direction perpendicular to the optical axis.

FIGS. 2A to 2D through FIGS. 4A to 4D show the aberrations of the objective lens of the first embodiment (numerical example 1) in the wide-angle end, a middle focal length position and the telephoto end, respectively, when the image-shake compensating function (image stabilizing function) is rendered inoperative.

FIGS. 5A to 5D show the comparison of the lateral aberrations with the axial beam of the first embodiment in the wide-angle end when a respective one of the lens units is moved in a direction perpendicular to the optical axis until the angle of deviation of ray on the object side reaches 0.3 degrees. FIG. 5A shows a case in the normal position (with all the lens units in a common axis). FIGS. 5B to 5D show cases when a respective one of the first to third lens units 1 to 3 is made to move in a direction perpendicular to the optical axis.

FIGS. 6A to 6D show the comparison of the lateral aberrations with the axial beam of the first embodiment in the telephoto end when a respective one of the lens units is moved in a direction perpendicular to the optical axis until the angle of deviation of ray on the object side reaches 0.3 degrees. FIG. 6A shows a case in the normal position (with all the lens units in a common axis). FIGS. 6B to 6D show cases when a respective one of the first to third lens units 1 to 3 is made to move in a direction perpendicular to the optical axis.

The use of the objective lens of the first embodiment in the observation optical system leads to a possibility that even if any one of the lens units is parallel-decentered from the optical axis, the lateral aberration changes to very little extent, as shown in FIGS. 5A to 5D and FIGS. 6A to 6D. Accordingly, a good optical performance can be obtained even when the image-shake compensating function is rendered operative.

(Second Embodiment)

FIG. 7 is a lens block diagram of a binocular according to a second embodiment of the invention. For the purpose of simplicity, in FIG. 7, there is illustrated only one of the left and right lens systems of the binocular. The second embodiment shows an example of the eyepiece lens suited to the objective lens of the first embodiment. A first lens unit 1, a second lens unit 2 and a third lens unit 3 which constitute an objective lens are exactly the same as those shown in the first embodiment. The eyepiece lens 4 is arranged to enlarge an object image OBI formed on the observation side of the erect prism P, while guiding the light beam therefrom to the observer's eye.

FIGS. 8A to 8D through FIGS. 10A to 10D show the aberrations with the afocal light beam of the binocular of the second embodiment (numerical example 2) in the wide-angle end, a middle focal length position and the telephoto end, respectively, when the image-shake compensating function (image stabilizing function) is rendered inoperative.

(Third Embodiment)

Figure 11:
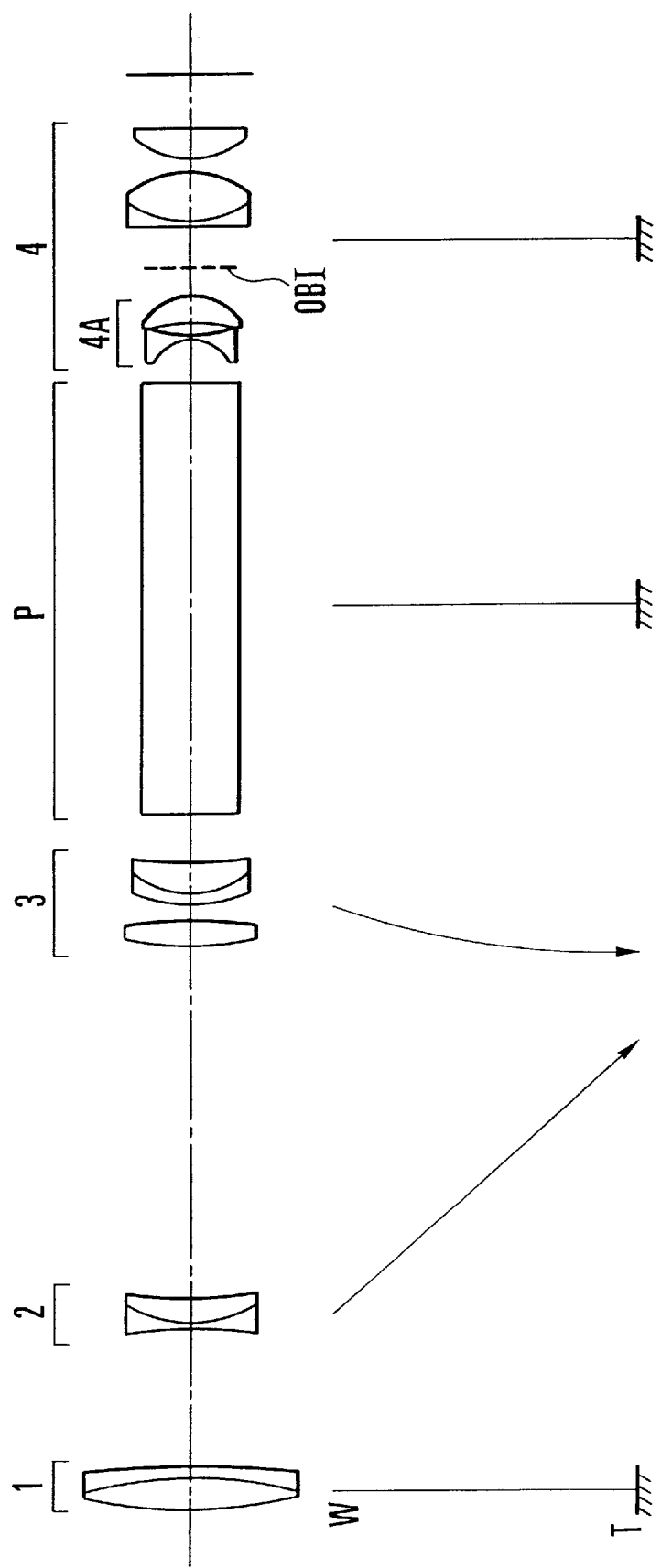
FIG. 11 is a longitudinal section view of a binocular according to a third embodiment of the invention.

FIG. 11 is a lens block diagram of a binocular according to a third embodiment of the invention.

The third embodiment shows another example of the eyepiece lens suited to the objective lens of the first embodiment. The eyepiece lens 4 of the third embodiment is different in construction and arrangement from that of the second embodiment, including a field flattener lens 4A as disposed on the object side of the object image OBI formed by the objective lens and the erect prism P. By using the field flattener lens 4A, the binocular of the third embodiment is better corrected particularly for curvature of field and astigmatism than that of the second embodiment.

FIGS. 12A to 12D through FIGS. 14A to 14D show the aberrations with the afocal light beam of the binocular of the third embodiment (numerical example 3) in the wide-angle end, a middle focal length position and the telephoto end, respectively, when the image-shake compensating function (image stabilizing function) is rendered inoperative.

(Fourth Embodiment)

Figure 15:
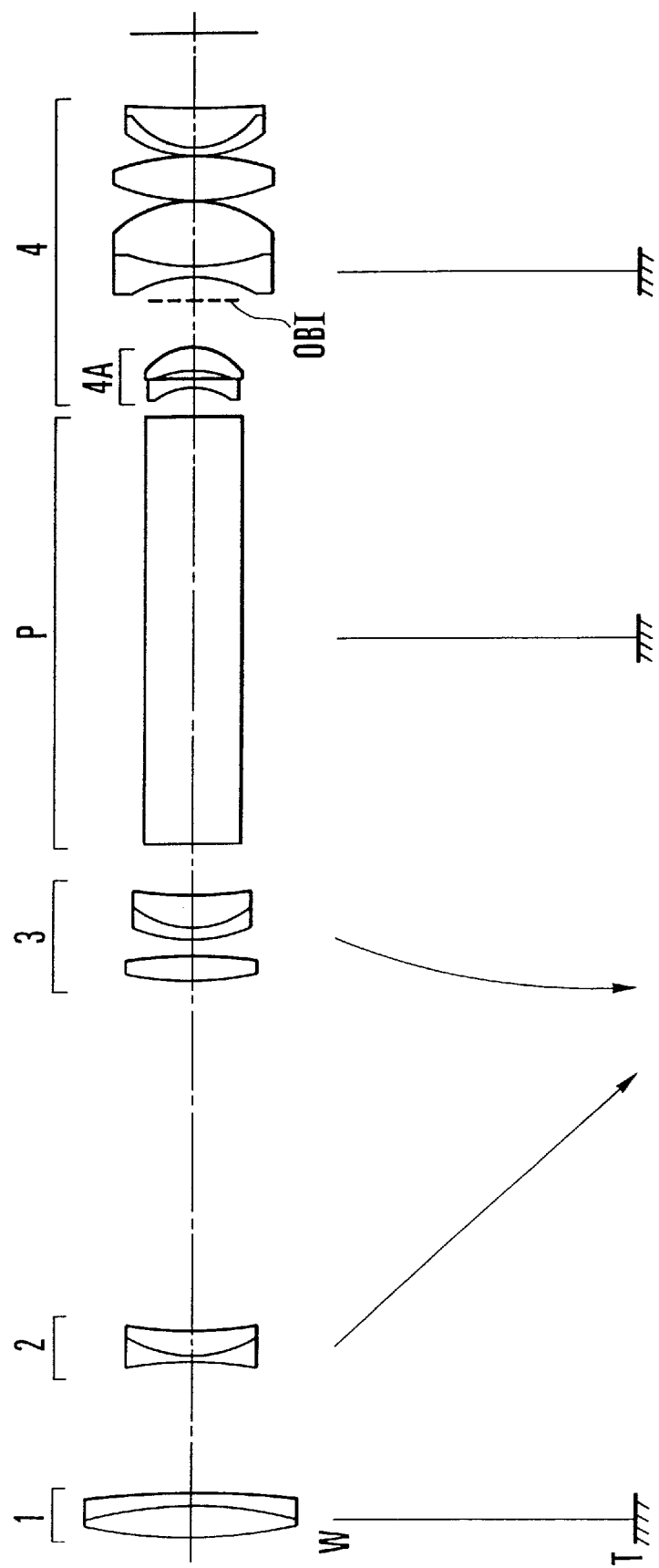
FIG. 15 is a longitudinal section view of a binocular according to a fourth embodiment of the invention.
Figures 16A, 16B, 16C, 16D:
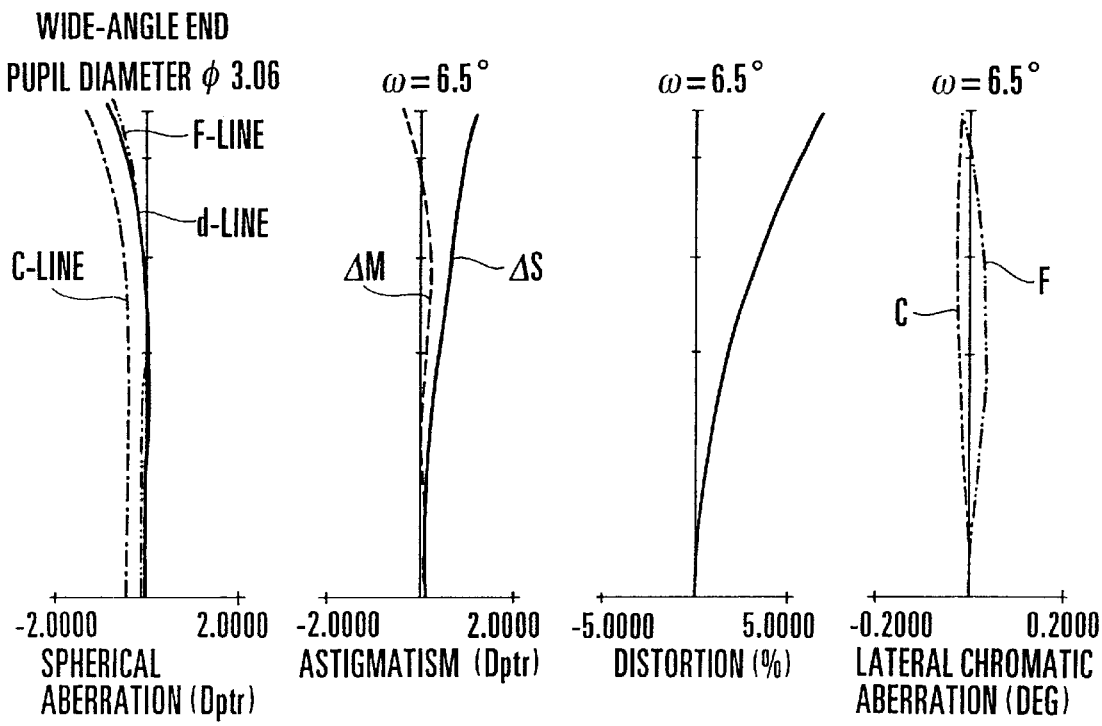
FIGS. 16A to 16D are graphic representations of the aberrations with the afocal beam of the binocular of the fourth embodiment in the wide-angle end when the image-shake compensating function is rendered inoperative.
Figures 17A, 17B, 17C, 17D:
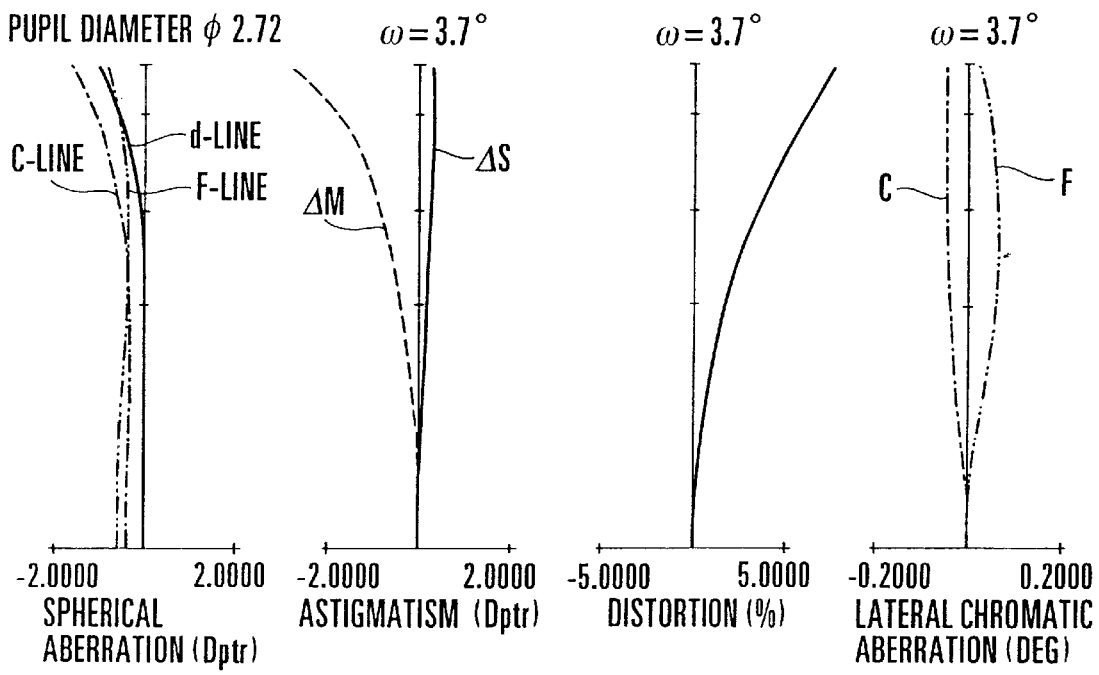
FIGS. 17A to 17D are graphic representations of the aberrations with the afocal beam of the binocular of the fourth embodiment in a middle focal length position when the image-shake compensating function is rendered inoperative.

FIG. 15 is a lens block diagram of a binocular according to a fourth embodiment of the invention.

The fourth embodiment shows yet another example of the eyepiece lens suited to the objective lens of the first embodiment. The eyepiece lens 4 of the fourth embodiment is different in construction and arrangement from that of the second embodiment, including a field flattener lens 4A as disposed on the object side of the object image OBI formed by the objective lens and the erect prism P. By using the field flattener lens 4A and increasing the number of those of the constituent lenses which lie on the observation side of the object image OBI, the binocular of the third embodiment has a longer eye relief and is better corrected for curvature of field and astigmatism than that of the second embodiment.

FIGS. 16A to 16D through FIGS. 18A to 18D show the aberrations with the afocal light beam of the binocular of the fourth embodiment (numerical example 4) in the wide-angle end, a middle focal length position and the telephoto end, respectively, when the image-shake compensating function (image stabilizing function) is rendered inoperative.

(Fifth Embodiment)

Figure 19:
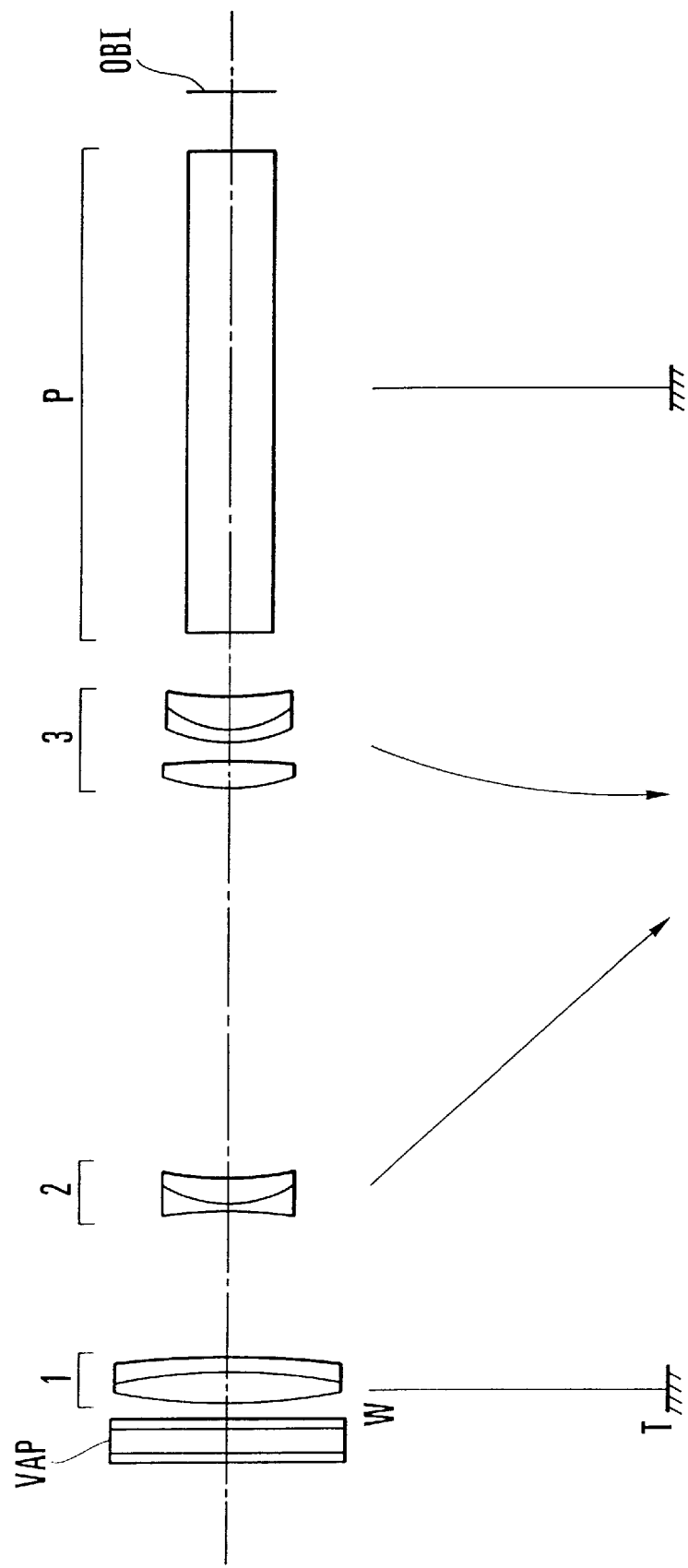
FIG. 19 is a longitudinal section view of an observation optical system according to a fifth embodiment of the invention.
Figures 20A, 20B, 20C, 20D:
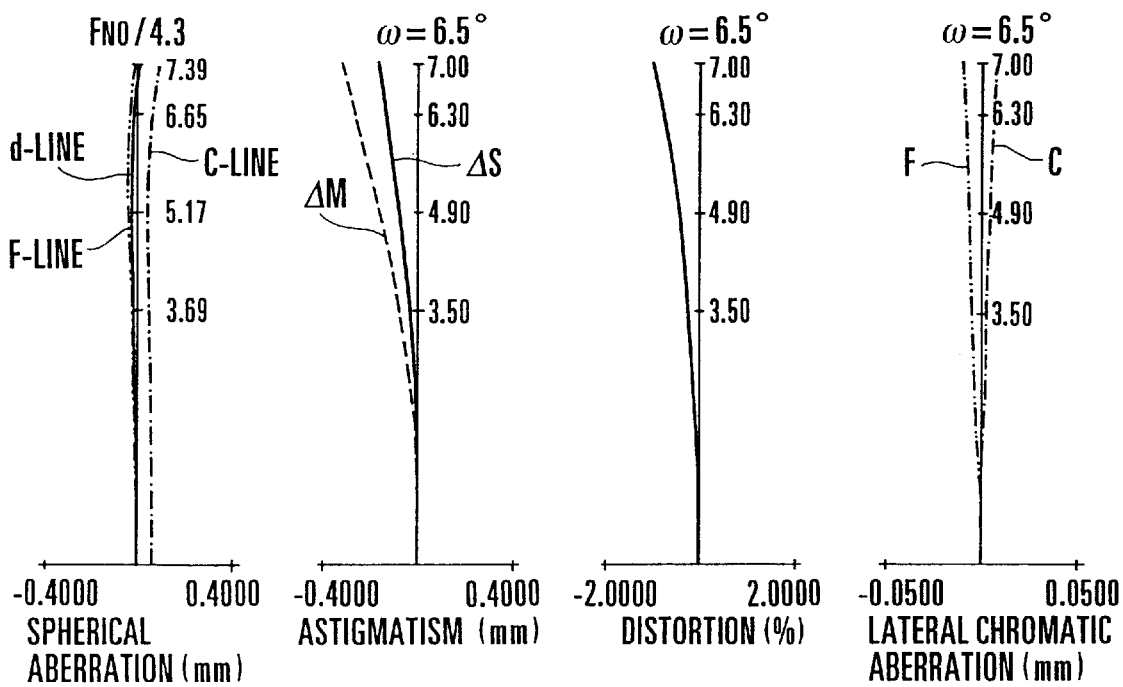
FIGS. 20A to 20D are graphic representations of the aberrations of the objective lens of the fifth embodiment in the wide-angle end when the image-shake compensating function is rendered inoperative.
Figures 21A, 21B, 21C, 21D:
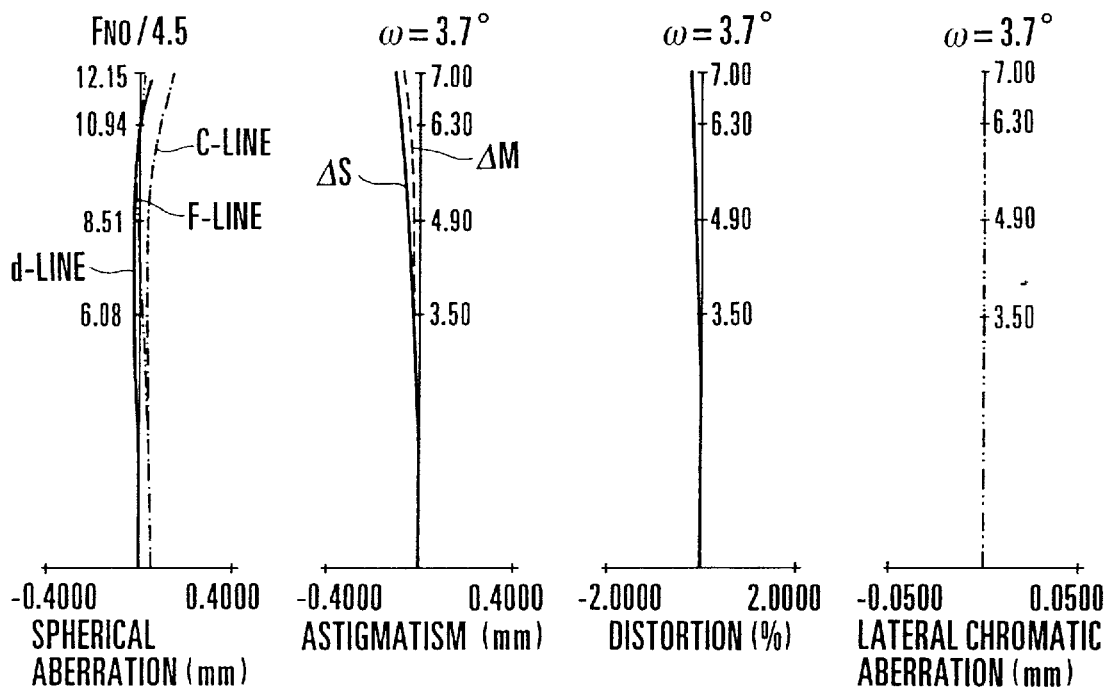
FIGS. 21A to 21D are graphic representations of the aberrations of the objective lens of the fifth embodiment in a middle focal length position when the image-shake compensating function is rendered inoperative.

FIG. 19 is a longitudinal section view showing the objective lens and the erect prism P in the binocular according to a fifth embodiment of the invention. In the fifth embodiment, the objective lens composed of first to third lens units 1 to 3 is the same as that of the first embodiment. For the purpose of simplicity, FIG. 19 is drawn by omitting an eyepiece lens, but the eyepiece lens shown in any of the second to fourth embodiments is used as a suitable one.

A characteristic feature of the fifth embodiment is that a variable angle prism VAP is disposed on the object side of the first lens unit 1, and on the basis of the vibration information detected by a vibration gyro-sensor (not shown), the apex angle of the variable angle prism VAP is varied to compensate for the image shake caused by the vibration of the hands holding the binocular. By arranging the variable angle prism VAP in the frontmost position as in the fifth embodiment, the amount of the varied apex angle for the equivalent amplitude of vibration can be made constant in any zooming position, thus assuring simplification of an electric circuit (not shown) for controlling the variable angle prism VAP.

FIGS. 20A to 20D through FIGS. 22A to 22D show the aberrations of the objective lens of the fifth embodiment (numerical example 5) in the wide-angle end, a middle focal length position and the telephoto end, respectively, when the image-shake compensating function is rendered inoperative.

FIGS. 23A to 23D show the comparison of the lateral aberrations with the axial light beam of the lens system of the fifth embodiment between when in the normal state and when the variable angle prism VAP is operated to deflect the principal ray to 0.3 degrees on the object side. FIG. 23A shows a case in the wide-angle end when in the normal state where the rays of light are not deflected by the variable angle prism VAP. FIG. 23B shows a case in the wide-angle end when the variable angle prism VAP is operative. FIG. 23C shows a case in the telephoto end when in the normal state. FIG. 23D shows a case in the telephoto end when the variable angle prism VAP is operative.

With the variable angle prism VAP operating in the telephoto end, somewhat decentering lateral chromatic aberration is produced as shown in FIG. 23D. In the other positions, however, almost no decentering aberrations are produced. A good optical performance can thus be obtained even when the image-shake compensating function is rendered operative.

(Sixth Embodiment)

Figure 24:
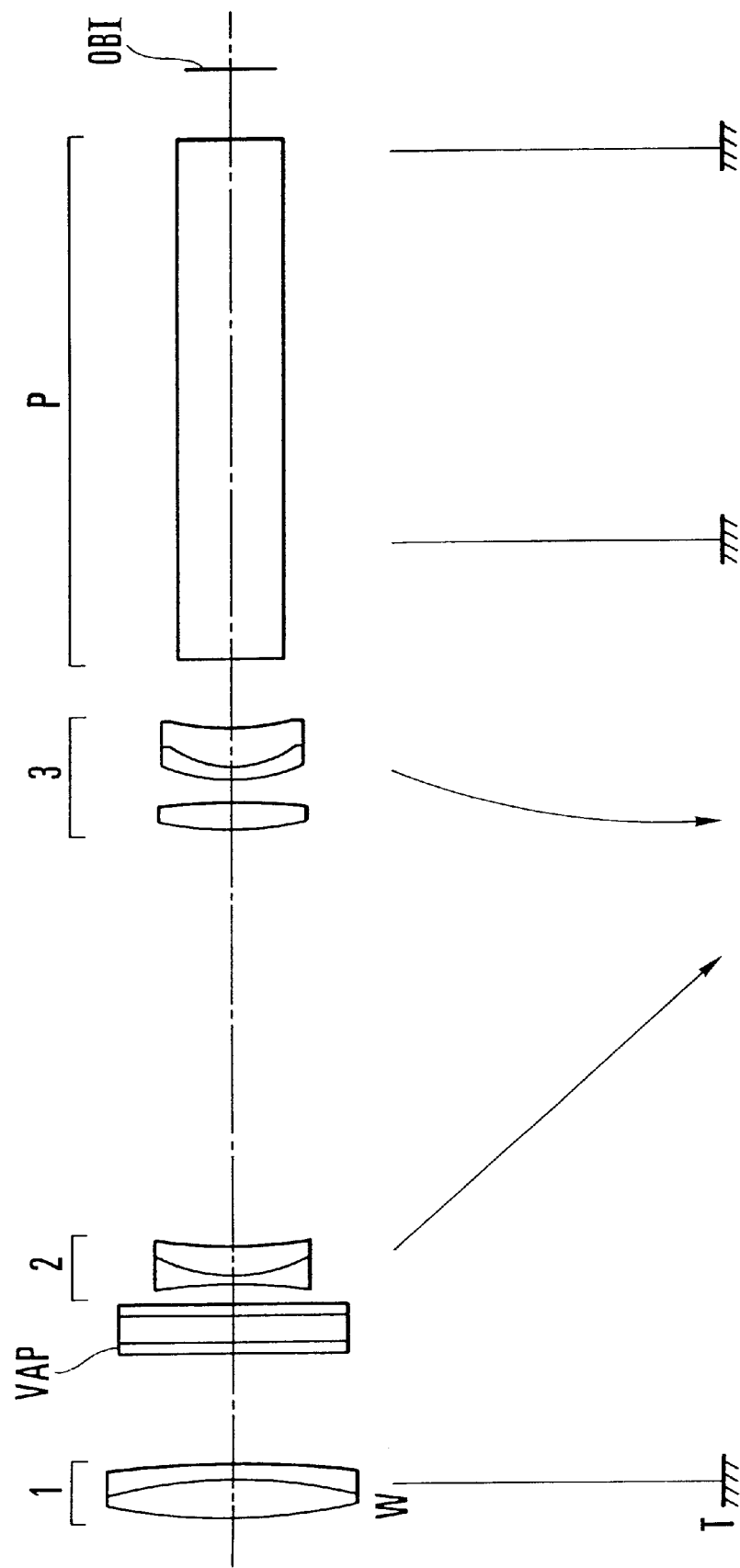
FIG. 24 is a longitudinal section view of an observation optical system according to a sixth embodiment of the invention.

FIG. 24 is a longitudinal section view showing the objective lens and the erect prism P in the binocular according to a sixth embodiment of the invention. In the sixth embodiment, too, the objective lens composed of first to third lens units 1 to 3 is the same as that of the first embodiment. Also, for the purpose of simplicity, FIG. 24 is drawn by omitting an eyepiece lens, but the eyepiece lens shown in any of the second to fourth embodiments is used as a suitable one.

A characteristic feature of the sixth embodiment is that a variable angle prism VAP is disposed in a space between the first lens unit 1 and the second lens unit 2, and on the basis of the vibration information detected by a vibration gyro-sensor (not shown), the apex angle of the variable angle prism VAP is varied to compensate for the image shake caused by the vibration of the hands holding the binocular. By arranging the variable angle prism VAP in the interior of the objective lens as in the sixth embodiment, the variable angle prism to be used can be reduced in the size, thus assuring minimization of the bulk and size of the apparatus as a whole.

FIGS. 25A to 25D through FIGS. 27A to 27D show the aberrations of the objective lens of the sixth embodiment (numerical example 6) in the wide-angle end, a middle focal length position and the telephoto end, respectively, when the image-shake compensating function is rendered inoperative.

FIGS. 28A to 28D show the comparison of the lateral aberrations with the axial light beam of the lens system of the sixth embodiment between when in the normal state and when the variable angle prism VAP is operated to deflect the principal ray to 0.3 degrees on the object side. FIG. 28A shows a case in the wide-angle end when in the normal state where the rays of light are not deflected by the variable angle prism VAP. FIG. 28B shows a case in the wide-angle end when the variable angle prism VAP is operative. FIG. 28C shows a case in the telephoto end when in the normal state. FIG. 28D shows a case in the telephoto end when the variable angle prism VAP is operative.

With the variable angle prism VAP operating in the telephoto end, somewhat decentering lateral chromatic aberration is produced as shown in FIG. 28D. In the other positions, however, almost no decentering aberrations are produced. A good optical performance can thus be obtained even when the image-shake compensating function is rendered operative.

(Seventh Embodiment)

Figure 29:
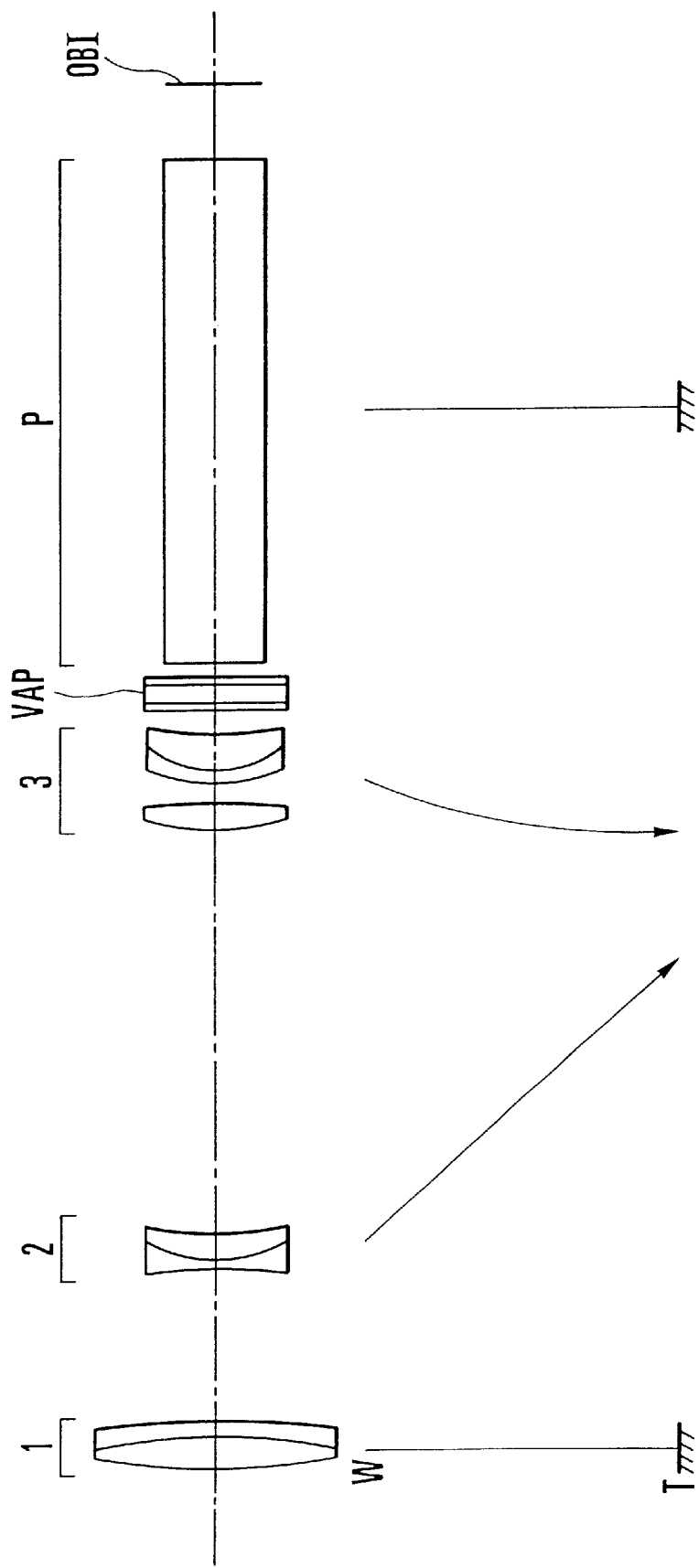
FIG. 29 is a longitudinal section view of an observation optical system according to a seventh embodiment of the invention.
Figures 32A, 32B, 32C, 32D:
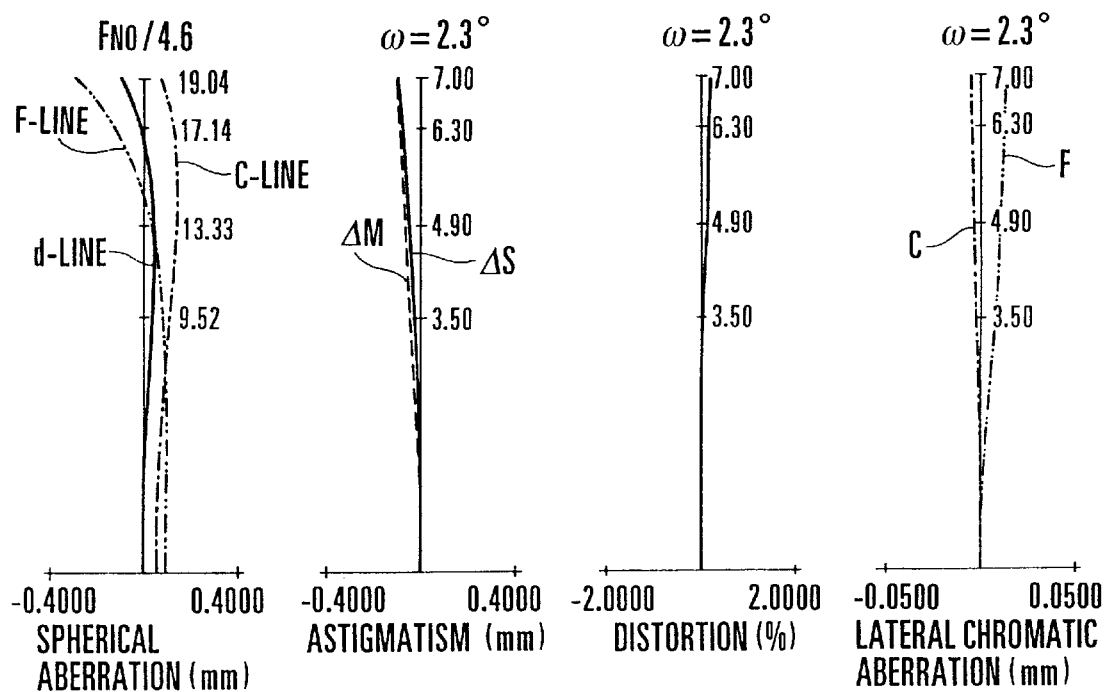
FIGS. 32A to 32D are graphic representations of the aberrations of the binocular of the seventh embodiment in the telephoto end when the image-shake compensating function is rendered inoperative.

FIG. 29 is a longitudinal section view showing the objective lens and the erect prism P in the binocular according to a seventh embodiment of the invention. In the seventh embodiment, too, the objective lens composed of first to third lens units 1 to 3 is the same as that of the first embodiment. Also, for the purpose of simplicity, FIG. 29 is drawn by omitting an eyepiece lens, but the eyepiece lens shown in any of the second to fourth embodiments is used as a suitable one.

A characteristic feature of the seventh embodiment is that a variable angle prism VAP is disposed in a space between the third lens unit 3 and the erect prism P, and on the basis of the vibration information detected by a vibration gyro-sensor (not shown), the apex angle of the variable angle prism VAP is varied to compensate for the image shake caused by the vibration of the hands holding the binocular. By arranging the variable angle prism VAP in the interior of the lens system as in the seventh embodiment, the variable angle prism to be used can be reduced in the size, thus assuring minimization of the bulk and size of the apparatus as a whole.

FIGS. 30A to 30D through FIGS. 32A to 32D show the aberrations of the objective lens of the seventh embodiment (numerical example 7) in the wide-angle end, a middle focal length position and the telephoto end, respectively, when the image-shake compensating function is rendered inoperative.

FIGS. 33A to 33D show the comparison of the lateral aberrations with the axial light beam of the lens system of the seventh embodiment between when in the normal state and when the variable angle prism VAP is operated to deflect the principal ray to 0.3 degrees on the object side. FIG. 33A shows a case in the wide-angle end when in the normal state where the rays of light are not deflected by the variable angle prism VAP. FIG. 33B shows a case in the wide-angle end when the variable angle prism VAP is operative. FIG. 33C shows a case in the telephoto end when in the normal state. FIG. 33D shows a case in the telephoto end when the variable angle prism VAP is operative.

With the variable angle prism VAP operating in the telephoto end, somewhat decentering lateral chromatic aberration is produced as shown in FIG. 33D. In the other positions, however, there are almost no decentering aberrations. A good optical performance can thus be obtained even when the image-shake compensating function is rendered operative.

(Eighth Embodiment)

Figure 34B:
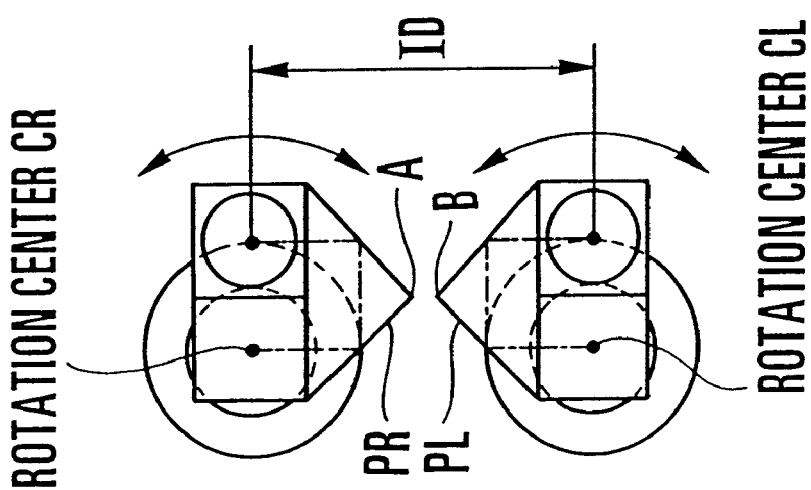
FIGS. 34A and 34B are respectively a top view and a back view of a binocular according to an eighth embodiment of the invention.
Figure 34A:
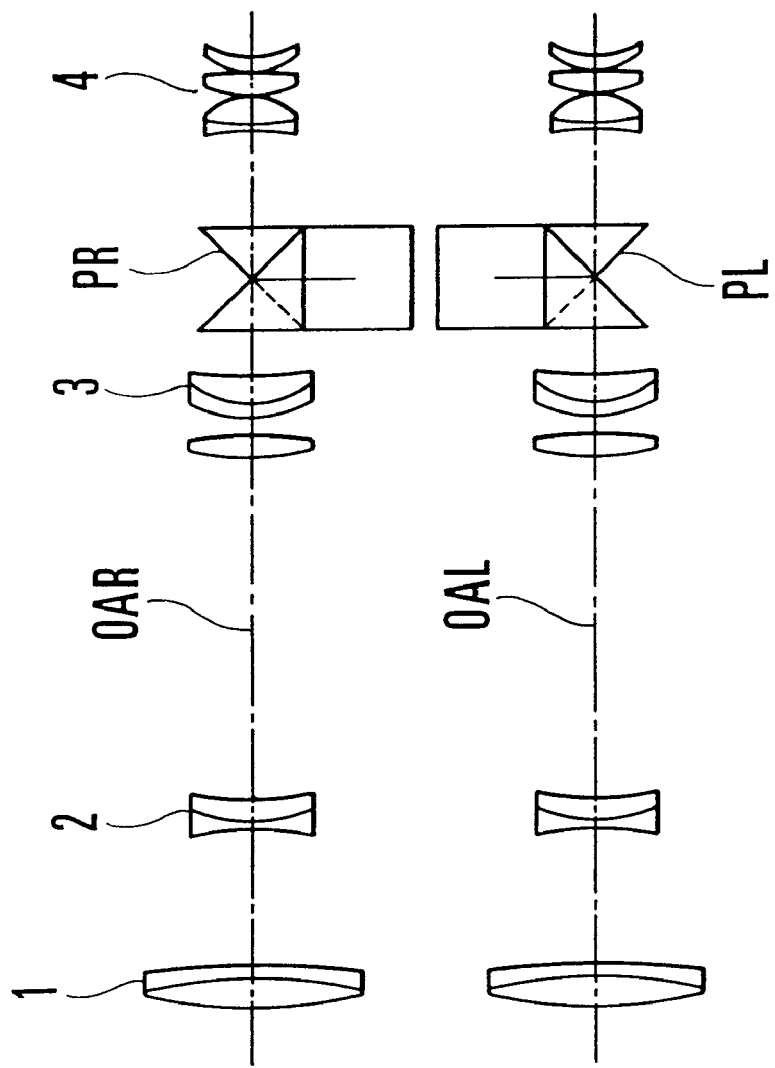

FIGS. 34A and 34B are respectively a top view and a back view (as looked from the observer) of a binocular according to an eighth embodiment of the invention in which, as the erect prism of the second embodiment, use is made of a large rectangular prism having adhered thereto two small rectangular prisms in differently oriented relation to form a porro-II type prism.

In the binocular of the eighth embodiment, a pair of the porro-II type prisms PL and PR are arranged upon interpupillary adjustment to bring the apices A and B of the large rectangular prisms into confrontation at a middle point in the adjustment width as shown in FIG. 34B. The left and right porro-II prisms PL and PR and the eyepiece lenses 4 are rotated respectively around the optical axes OAL and OAR of the left and right objective lenses to adjust the interpupillary distance ID to the individual users.

Such an arrangement of the porro-II prisms PL and PR enables a large width of interpupillary adjustment to be realized by a small angle of rotation. Moreover, the prism casings do not awkwardly extrude, thus making it possible to realize a compact zoom binocular as a whole. Also, since the eyepiece lenses 4 in the pair are able to axially move independently of each other, the left and right eyesight can be adjusted and the position error of the plane of sharp focus resulting from zooming can be corrected.

(Ninth Embodiment)

Figure 35B:
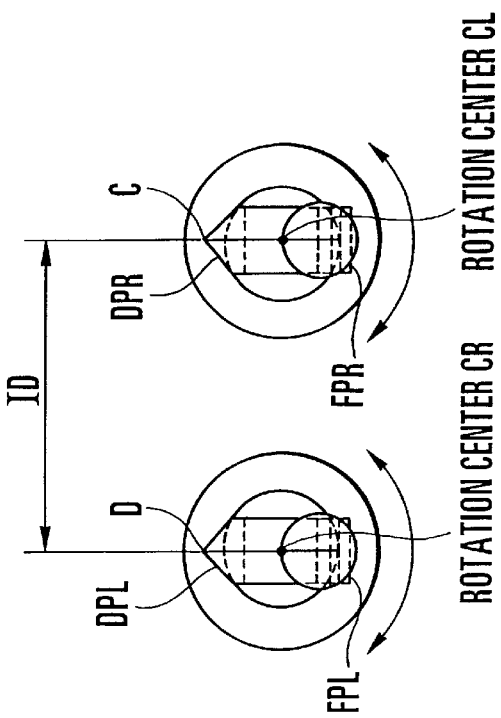
FIGS. 35A and 35B are respectively a side view and a back view of a binocular according to a ninth embodiment of the invention.
Figure 35A:
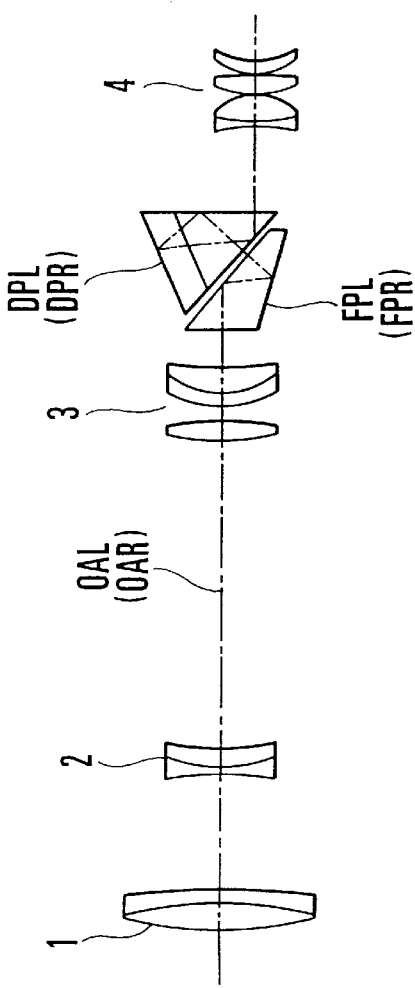
Figure 36:
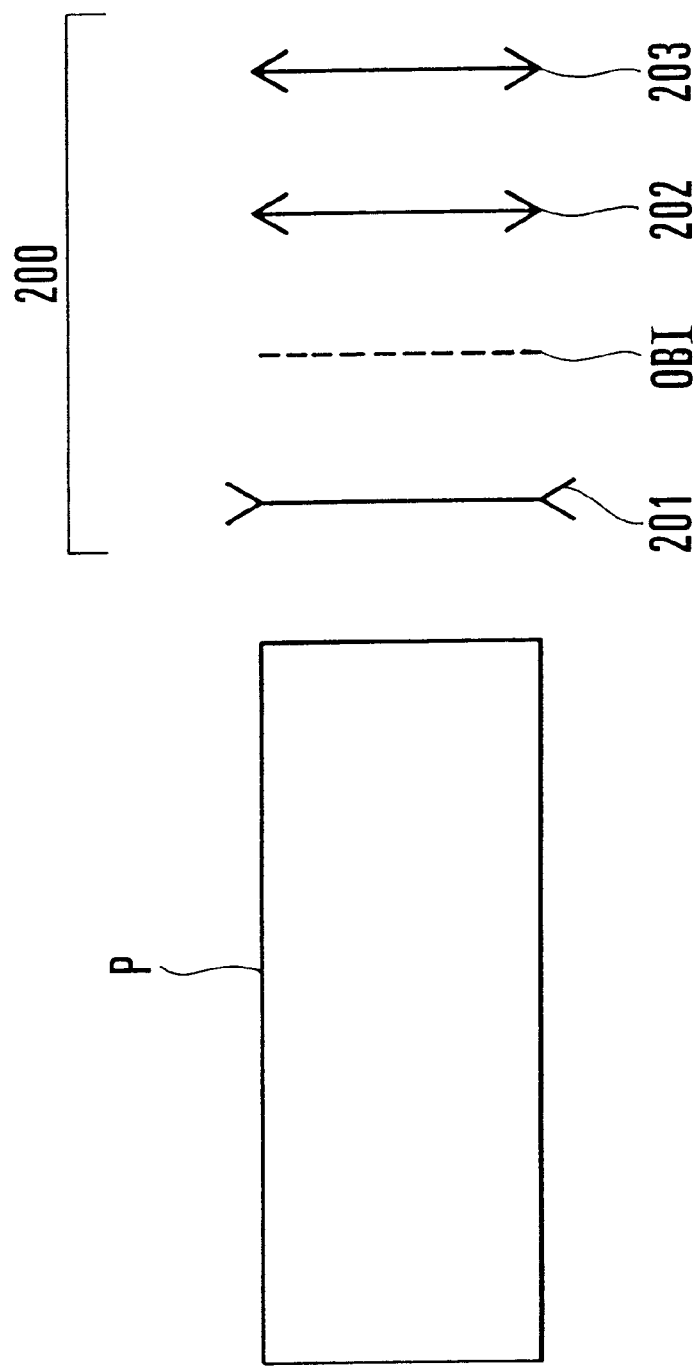
FIG. 36 is a schematic diagram of a thin lens system in the conventional binocular.

FIGS. 35A and 35B are respectively a side view (as looked from the left) and a back view of a binocular according to a ninth embodiment of the invention in which, as the erect prism of the second embodiment, use is made of a combination of an auxiliary or front prism FPL (FPR) and a roof prism DPL (DPR) each having an entering optical axis and an exiting optical axis deviating from each other.

In the binocular of the ninth embodiment, a pair of the roof prisms DPL and DPR are arranged upon interpupillary adjustment to bring their apices C and D into upward orientation relative to the left and right objective lenses at a middle point in the adjustment width as shown in FIG. 35B. The left and right assemblies of auxiliary prisms FPL and FPR, roof prisms DPL and DPR and eyepiece lenses 4 are rotated respectively around the optical axes OAL and OAR of the left and right objective lenses to adjust the interpupillary distance ID to the individual users.

Such an arrangement of the auxiliary prism FPL (FPR) and roof prism DPL (DPR) enables a large width of interpupillary adjustment to be realized by a small angle of rotation. Moreover, the prism casings do not awkwardly extrude, thus making it possible to realize a compact zoom binocular as a whole.

Next, on the design of the observation optical system of the invention, preferable conditions are described below.

Letting the overall lateral magnification in the telephoto end of all the lens units excluding the first lens unit in the objective lens be denoted by $\beta t$, it is preferred that the following condition is satisfied:

$$0.7 < \beta t < 1.4 \tag{1}$$

Further, the range of the above-described condition (1) is more desirably altered as follows:

$$0.8 < \beta t < 1.3 \tag{1'}$$

In the ranges beyond the lower and upper limits of the condition (1), the overall powers of all the lens units excluding the first lens unit becomes too strong in the telephoto end. In a case where the optical axis of the objective lens is slightly inclined, the variation with zooming of the left and right optical axes becomes objectionably large. Here, on the assumption that the overall lateral magnification in the telephoto end of the second and third lens units is "1", then the overall power is lost in the telephoto end. In a case where the optical axes of the left and right objective lenses are found to have inclined, the first lens unit is moved in a direction perpendicular to the optical axis, thus adjusting the left and right axial alignments. Then, even when zooming to the telephoto end is performed, no zooming error occurs between the left and right optical axes.

In the first to ninth embodiments, the overall lateral magnification of the objective lens excluding the first lens unit, that is, the overall lateral magnification $\beta t$ of the second and third lens units in the telephoto end is "0.910".

Also, for the binocular of the type shown in the ninth embodiment, it is preferred to satisfy the following condition:

$$45° < A < 135° \tag{2}$$

where A is an angle a line which connects optical axes of the objective lenses with each other makes with respect to a line which connects the optical axis of each of the objective lenses with an apex of a roof surface of each of the roof prisms in a middle position in a width of adjustment for interpupillary adjustment.

Further, the range of the above-described condition (2) is more desirably altered as follows:

$$55° < A < 125° \tag{2'}$$

In the ranges beyond the lower and upper limits of the condition (2), even if the auxiliary prism, roof prism and eyepiece lens are rotated around the optical axis of the objective lens to any angle, the interpupillary distance does not result in large enough change. So, these violations are objectionable.

In the ninth embodiment, the angle A is as follows:

$$A = 90°.$$

Next, seven numerical examples 1 to 7 corresponding to the first to seventh embodiments described above are shown. In the numerical data for the examples 1 to 7, ri is the radius of curvature of the i-th lens surface, when counted from the object side, di is the separation between the i-th and (i+1)st surfaces, when counted from the object side, ni is the refractive index for the spectral d-line of the i-th optical member, when counted from the object side, and vi is the Abbe number of the i-th optical member, when counted from the object side.

(Numerical Example 1)
f = 61.55~175.17 Fno = 1:4.3~4.6 2ω = 13°~4.6°

| | | | |
|---|---|---|---|
| r1 = 112.526 | d1 = 5.98 | n1 = 1.51633 | ν1 = 64.2 |
| r2 = −78.491 | d2 = 1.90 | n2 = 1.60342 | ν2 = 38.0 |
| r3 = −348.351 | d3 = Variable | | |
| r4 = −89.765 | d4 = 1.20 | n3 = 1.72342 | ν3 = 38.0 |
| r5 = 23.994 | d5 = 4.43 | n4 = 1.84666 | ν4 = 23.8 |
| r6 = 60.816 | d6 = Variable | | |
| r7 = 54.304 | d7 = 4.05 | n5 = 1.72342 | ν5 = 38.0 |
| r8 = −214.784 | d8 = 3.48 | | |
| r9 = 28.962 | d9 = 2.00 | n6 = 1.84666 | ν6 = 23.8 |
| r10 = 17.740 | d10 = 5.69 | n7 = 1.48749 | ν7 = 70.2 |
| r11 = 48.670 | d11 = Variable | | |
| r12 = ∞ | d12 = 80.00 | n8 = 1.56833 | ν8 = 56.1 |
| r13 = ∞ | | | |

| Variable | Focal Length | | |
|---|---|---|---|
| Separation | 61.55 | 107.33 | 175.17 |
| d3 | 25.38 | 50.92 | 76.47 |
| d6 | 65.47 | 30.56 | 1.62 |
| d11 | 10.67 | 20.03 | 23.42 |

(Numerical Example 2)

| | | | |
|---|---|---|---|
| r1 = 112.526 | d1 = 5.98 | n1 = 1.51633 | ν1 = 64.2 |
| r2 = −78.491 | d2 = 1.90 | n2 = 1.60342 | ν2 = 38.0 |
| r3 = −348.351 | d3 = Variable | | |
| r4 = −89.765 | d4 = 1.20 | n3 = 1.72342 | ν3 = 38.0 |
| r5 = 23.994 | d5 = 4.43 | n4 = 1.84666 | ν4 = 23.8 |
| r6 = 60.816 | d6 = Variable | | |
| r7 = 54.304 | d7 = 4.05 | n5 = 1.72342 | ν5 = 38.0 |
| r8 = −214.784 | d8 = 3.48 | | |
| r9 = 28.962 | d9 = 2.00 | n6 = 1.84666 | ν6 = 23.8 |
| r10 = 17.740 | d10 = 5.69 | n7 = 1.48749 | ν7 = 70.2 |
| r11 = 48.670 | d11 = Variable | | |
| r12 = ∞ | d12 = 80.00 | n8 = 1.56883 | ν8 = 56.3 |
| r13 = ∞ | d13 = 19.25 | | |
| r14 = −30.945 | d14 = 1.00 | n9 = 1.84666 | ν9 = 23.8 |
| r15 = 26.111 | d15 = 0.15 | | |
| r16 = 25.422 | d16 = 6.21 | n10 = 1.60311 | ν10 = 60.7 |
| r17 = −11.619 | d17 = 0.20 | | |
| r18 = 24.490 | d18 = 3.55 | n11 = 1.60311 | ν11 = 60.7 |
| r19 = −123.371 | d19 = 0.20 | | |
| r20 = 11.207 | d20 = 3.29 | n12 = 1.60311 | ν12 = 60.7 |
| r21 = 17.951 | d21 = 10.00 | | |
| r22 = ∞ | | | |

| Variable | Magnification | | |
|---|---|---|---|
| Separation | 5.33× | 9.30× | 15.18× |
| d3 | 25.37 | 50.92 | 76.47 |
| d6 | 65.47 | 30.56 | 1.62 |
| d11 | 8.67 | 18.03 | 21.42 |

(Numerical Example 3)

| | | | |
|---|---|---|---|
| r1 = 112.526 | d1 = 5.98 | n1 = 1.51633 | ν1 = 64.2 |
| r2 = −78.491 | d2 = 1.90 | n2 = 1.60342 | ν2 = 38.0 |
| r3 = −348.351 | d3 = Variable | | |
| r4 = −89.765 | d4 = 1.20 | n3 = 1.72342 | ν3 = 38.0 |
| r5 = 23.994 | d5 = 4.43 | n4 = 1.84666 | ν4 = 23.8 |
| r6 = 60.816 | d6 = Variable | | |
| r7 = 54.304 | d7 = 4.05 | n5 = 1.72342 | ν5 = 38.0 |
| r8 = −214.784 | d8 = 3.48 | | |
| r9 = 28.962 | d9 = 2.00 | n6 = 1.84666 | ν6 = 23.8 |
| r10 = 17.740 | d10 = 5.69 | n7 = 1.48749 | ν7 = 70.2 |
| r11 = 48.670 | d11 = Variable | | |
| r12 = ∞ | d12 = 80.00 | n8 = 1.56883 | ν8 = 56.3 |
| r13 = ∞ | d13 = 7.22 | | |
| r14 = −7.887 | d14 = 1.08 | n9 = 1.51742 | ν9 = 52.4 |
| r15 = 39.802 | d15 = 1.64 | | |
| r16 = −33.532 | d16 = 5.09 | n10 = 1.83400 | ν10 = 37.2 |
| r17 = −10.601 | d17 = 12.50 | | |
| r18 = −577.539 | d18 = 1.35 | n11 = 1.80518 | ν11 = 25.4 |
| r19 = 19.330 | d19 = 9.43 | n12 = 1.62299 | ν12 = 58.2 |

-continued

| | | | |
|---|---|---|---|
| r20 = −16.915 | d20 = 2.70 | | |
| r21 = 16.880 | d21 = 5.26 | n13 = 1.62299 | ν13 = 58.2 |
| r22 = 662.770 | d22 = 40.80 | | |
| r23 = ∞ | | | |

| Variable | Magnification | | |
|---|---|---|---|
| Separation | 5.66× | 9.87× | 16.11× |
| d3 | 25.37 | 50.92 | 76.47 |
| d6 | 65.47 | 30.56 | 1.62 |
| d11 | 8.67 | 18.03 | 21.42 |

(Numerical Example 4)

| | | | |
|---|---|---|---|
| r1 = 112.526 | d1 = 5.98 | n1 = 1.51633 | ν1 = 64.2 |
| r2 = −78.491 | d2 = 1.90 | n2 = 1.60342 | ν2 = 38.0 |
| r3 = −348.351 | d3 = Variable | | |
| r4 = −89.765 | d4 = 1.20 | n3 = 1.72342 | ν3 = 38.0 |
| r5 = 23.994 | d5 = 4.43 | n4 = 1.84666 | ν4 = 23.8 |
| r6 = 60.816 | d6 = Variable | | |
| r7 = 54.304 | d7 = 4.05 | n5 = 1.72342 | ν5 = 38.0 |
| r8 = −214.784 | d8 = 3.48 | | |
| r9 = 28.962 | d9 = 2.00 | n6 = 1.84666 | ν6 = 23.8 |
| r10 = 17.740 | d10 = 5.69 | n7 = 1.48749 | ν7 = 70.2 |
| r11 = 48.670 | d11 = Variable | | |
| r12 = ∞ | d12 = 80.00 | n8 = 1.56883 | ν8 = 56.3 |
| r13 = ∞ | d13 = 5.5 | | |
| r14 = −11.155 | d14 = 1.20 | n9 = 1.51742 | ν9 = 52.4 |
| r15 = 78.480 | d15 = 1.88 | | |
| r16 = −20.766 | d16 = 4.00 | n10 = 1.83400 | ν10 = 37.2 |
| r17 = −11.973 | d17 = 12.50 | | |
| r18 = −23.270 | d18 = 1.50 | n11 = 1.80518 | ν11 = 25.4 |
| r19 = 35.239 | d19 = 12.40 | n12 = 1.62299 | ν12 = 58.2 |
| r20 = −19.307 | d20 = 0.20 | | |
| r21 = 44.900 | d21 = 7.75 | n13 = 1.62299 | ν13 = 58.2 |
| r22 = −44.900 | d22 = 0.20 | | |
| r23 = 23.968 | d23 = 1.50 | n14 = 1.72825 | ν14 = 28.5 |
| r24 = 13.424 | d24 = 7.70 | n15 = 1.62299 | ν15 = 58.2 |
| r25 = 78.226 | d25 = 15.00 | | |
| r26 = ∞ | | | |

| Variable | Magnification | | |
|---|---|---|---|
| Separation | 5.13× | 8.95× | 14.61× |
| d3 | 25.37 | 50.92 | 76.47 |
| d6 | 65.47 | 30.56 | 1.62 |
| d11 | 8.67 | 18.03 | 21.42 |

(Numerical Example 5)
f = 61.54585 Fno = 1:4.3~4.6 2ω = 13°~4.6°

| | | | |
|---|---|---|---|
| r1 = ∞ | d1 = 2.00 | n1 = 1.51633 | ν1 = 64.2 |
| r2 = ∞ | d2 = 4.00 | n2 = 1.41650 | ν2 = 52.2 |
| r3 = ∞ | d3 = 2.00 | n3 = 1.51633 | ν3 = 64.2 |
| r4 = ∞ | d4 = 2.00 | | |
| r5 = 112.526 | d5 = 5.98 | n4 = 1.51633 | ν4 = 64.2 |
| r6 = −78.491 | d6 = 1.90 | n5 = 1.60342 | ν5 = 38.0 |
| r7 = −348.351 | d7 = Variable | | |
| r8 = −89.765 | d8 = 1.20 | n6 = 1.72342 | ν6 = 38.0 |
| r9 = 23.994 | d9 = 4.43 | n7 = 1.84666 | ν7 = 23.8 |
| r10 = 60.816 | d10 = Variable | | |
| r11 = 54.304 | d11 = 4.05 | n8 = 1.72342 | ν8 = 38.0 |
| r12 = −214.784 | d12 = 3.48 | | |
| r13 = 28.962 | d13 = 2.00 | n9 = 1.84666 | ν9 = 23.8 |
| r14 = 17.740 | d14 = 5.69 | n10 = 1.48749 | ν10 = 70.2 |
| r15 = 48.670 | d15 = Variable | | |
| r16 = ∞ | d16 = 80.00 | n11 = 1.56883 | ν11 = 56.1 |
| r17 = ∞ | | | |

| Variable | Focal Length | | |
|---|---|---|---|
| Separation | 61.55 | 107.33 | 175.17 |
| d7 | 25.38 | 50.92 | 76.47 |
| d10 | 65.47 | 30.56 | 1.62 |
| d11 | 10.67 | 20.03 | 23.42 |

-continued (Numerical Example 6)
f = 61.54577 Fno = 1:4.3~4.6 2ω = 13°~4.6°

| | | | |
|---|---|---|---|
| r1 = 112.526 | d1 = 5.98 | n1 = 1.51633 | v1 = 64.2 |
| r2 = −78.491 | d2 = 1.90 | n2- 1.60342 | v2 = 38.0 |
| r3 = −348.351 | d3 = 17.00 | | |
| r4 = ∞ | d4 = 2.00 | n3 = 1.51633 | v3 = 64.2 |
| r5 = ∞ | d5 = 4.00 | n4 = 1.41650 | v4 = 52.2 |
| r6 = ∞ | d6 = 2.00 | n5 = 1.51633 | v5 = 64.2 |
| r7 = ∞ | d7 = Variable | | |
| r8 = −89.765 | d8 = 1.20 | n6 = 1.72342 | v6 = 38.0 |
| r9 = 23.994 | d9 = 4.43 | n7 = 1.84666 | v7 = 23.8 |
| r10 = 60.816 | d10 = Variable | | |
| r11 = 54.304 | d11 = 4.05 | n8 = 1.72342 | v8 = 38.0 |
| r12 = −214.784 | d12 = 3.48 | | |
| r13 = 28.962 | d13 = 2.00 | n9 = 1.84666 | v9 = 23.8 |
| r14 = 17.740 | d14 = 5.69 | n10 = 1.48749 | v10 = 70.2 |
| r15 = 48.670 | d15 = Variable | | |
| r16 = ∞ | d16 = 80.00 | n11 = 1.56883 | v11 = 56.1 |
| r17 = ∞ | | | |

| Variable Separation | Focal Length | | |
|---|---|---|---|
| | 61.55 | 107.33 | 175.17 |
| d7 | 2.91 | 28.46 | 54.01 |
| d10 | 65.47 | 30.56 | 1.62 |
| d15 | 10.67 | 20.03 | 23.42 |

(Numerical Example 7)
f = 61.54585 Fno = 1:4.3~4.6 2ω = 13°~4.6°

| | | | |
|---|---|---|---|
| r1 = 112.526 | d1 = 5.98 | n1 = 1.51633 | v1 = 64.2 |
| r2 = −78.491 | d2 = 1.90 | n2 = 1.60342 | v2 = 38.0 |
| r3 = −348.351 | d3 = Variable | | |
| r4 = −89.765 | d4 = 1.20 | n3 = 1.72342 | v3 = 38.0 |
| r5 = 23.994 | d5 = 4.43 | n4 = 1.84666 | v4 = 23.8 |
| r6 = 60.816 | d6 = Variable | | |
| r7 = 54.304 | d7 = 4.05 | n5 = 1.72342 | v5 = 38.0 |
| r8 = −214.784 | d8 = 3.48 | | |
| r9 = 28.962 | d9 = 2.00 | n6 = 1.84666 | v6 = 23.8 |
| r10 = 17.740 | d10 = 5.69 | n7 = 1.48749 | v7 = 70.2 |
| r11 = 48.670 | d11 = Variable | | |
| r12 = ∞ | d12 = 1.00 | n8 = 1.51633 | v8 = 64.2 |
| r13 = ∞ | d13 = 3.00 | n9 = 1.41650 | v9 = 52.2 |
| r14 = ∞ | d14 = 1.00 | n10 = 1.51633 | v10 = 64.2 |
| r15 = ∞ | d15 = 3.00 | | |
| r16 = ∞ | d16 = 80.00 | n11 = 1.56883 | v11 = 56.1 |
| r17 = ∞ | | | |

| Variable Separation | Focal Length | | |
|---|---|---|---|
| | 61.55 | 107.33 | 175.17 |
| d3 | 25.38 | 50.92 | 76.47 |
| d6 | 65.47 | 30.56 | 1.62 |
| d11 | 3.70 | 13.07 | 16.46 |

In the observation optical systems shown in the first to ninth embodiments, because the magnification is varied by the objective lens, as compared with the conventional system in which the magnification is varied by the eyepiece lens, many advantages exist as follows.

(a) The real field coverage and the apparent field coverage in the wide-angle end can be widened.

(b) The change of the apparent field angle due to zooming can be diminished.

(c) Even if the observer has a deviated eyesight from 0 in diopter (because of the nearsightedness or farsightedness), the eyesight error during zooming can be removed.

(d) The zoom ratio can be large.

As described above, according to the present embodiments, it is made possible to realize an observation optical system of widened angular coverage at the low magnification without having to increase the size of the apparatus.

What is claimed is:

1. A binocular comprising, in order from an object side to an observation side:
   a pair of objective optical systems of which focal lengths vary respectively;
   a pair of erect optical systems; and
   a pair of eyepiece optical systems for observing a pair of object images respectively formed through said pair of objective optical systems,
   wherein each one of said objective optical systems has a plurality of lens units including a first lens unit which (a) is located closest of the plurality of lens units to the object side of said objective optical system, (b) is of a positive refractive power, and (c) consists of a cemented lens composed of, in order from the object side, a positive lens and a negative lens, and
   wherein each one of said pair of objective optical systems satisfies the following condition:

$0.7 < \beta t < 1.4$ where $\beta t$ is an overall lateral magnification in a telephoto end of each one of said pair of objective optical systems excluding said first lens unit.

2. A binocular according to claim 1, wherein at least one of said plurality of lens units constituting each one of said pair of objective optical systems is displaced in a direction to have a component perpendicular to an optical axis to compensate for an image shake.

3. A binocular according to claim 1, wherein said pair of objective optical systems form the pair of object images on the observation side of said pair of erect optical systems, respectively.

4. A binocular according to claim 1, wherein said pair of objective optical systems satisfies the following condition:

$0.8 < \beta t < 1.3$.

5. A binocular comprising, in order from an object side to an observation side:
   a pair of objective optical systems of which focal lengths vary respectively,
   a pair of erect optical systems, and
   a pair of eyepiece optical systems for observing a pair of object images respectively formed through said pair of objective optical systems,
   wherein each one of said pair of objective optical systems has a member for compensating for an image shake,
   wherein each one of said objective optical systems has a plurality of lens units including a first lens unit which (a) is located closest of the plurality of lens units of said objective optical system to the object side of said objective optical system, (b) is of a positive refractive power, and (c) consists of a cemented lens composed of, in order from the object side, a positive lens and a negative lens.

6. A binocular according to claim 5, wherein at least one of said plurality of lens units constituting each one of said pair of objective optical systems is said member for compensation for the image shake, and is displaced in a direction to have a component perpendicular to an optical axis to compensate for the image shake.

7. A binocular according to claim 5, wherein said pair of objective optical systems form the pair of object images on the observation side of said pair of erect optical systems, respectively.

* * * * *